United States Patent [19]

Kuwabara et al.

[11] Patent Number: 5,090,872
[45] Date of Patent: Feb. 25, 1992

[54] METHOD OF CONTROLLING THE OPERATION OF A PUMP IN A PUMPING INSTALLATION BY DETECTING COUNTERFLOW

[75] Inventors: Takao Kuwabara, Hitachi; Ezo Kita, Kyoto; Isao Yokoyama, Himeji; Hiroto Nakagawa, Osaka; Yasuteru Oono, Kobe, all of Japan

[73] Assignees: Hitachi Ltd., Tokyo; The Kansai Electric Power Co., Inc., Osaka, both of Japan

[21] Appl. No.: 441,639

[22] Filed: Nov. 27, 1989

[30] Foreign Application Priority Data

Nov. 28, 1988 [JP] Japan .................. 63-298204

[51] Int. Cl.⁵ .............................. F04B 49/00
[52] U.S. Cl. .......................... 417/53; 417/22; 417/45
[58] Field of Search .............. 417/22, 45, 53

[56] References Cited

U.S. PATENT DOCUMENTS 4,253,794 3/1981 Kuwabara ........................... 415/1
4,708,594 11/1987 Shinmei et al. ..................... 417/45

Primary Examiner—Richard A. Bertsch
Assistant Examiner—David W. Scheuermann
Attorney, Agent, or Firm—Antonelli, Terry Stout & Kraus

[57] ABSTRACT

A method of detecting a counterflow in a pump comprises providing with detecting means for detecting variations in the discharge pressure of the pump and signal analyzing means for analyzing oscillation components contained in an output signal from the pressure detecting means, and detecting the pump's operating point to have entered a counterflow characteristic operation region when a waveform of the detection signal generated in association with the variations in the discharge pressure of the pump exhibits a predetermined spectrum distribution. Further, when it is detected that the operating point enters a counterflow characteristic operation region, the escape from that region is performed by temporally throttling the guide vane and temporally increasing the rotating speed.

5 Claims, 19 Drawing Sheets

METHOD OF CONTROLLING THE OPERATION OF A PUMP IN A PUMPING INSTALLATION BY DETECTING COUNTERFLOW

BACKGROUND OF THE INVENTION:

1. Field of the Invention:

The present invention relates to a method of controlling the operation of a pump of a relatively large capacity and, more particularly a method of controlling the operation of a pump in a pumping installation particularly suitable for a variable-speed reversible pump hydraulic turbine in a pumping-up electric power station or the like.

2. Description of the Prior Art:

Generally, in pumping-up electric power stations or the like, hydraulic machinery, operated as a hydraulic turbine in a generating mode and as a pump in a pumping-up mode, is used, and then this machinery is switched to be used so that energy is supplied to an electric power system through a generator in generating mode and consumed through an electric motor in pumping-up mode. In this case, it is known that when the pump is operated, there is a case of illustrating a counterflow characteristic (a characteristic of partially exhibiting positive values for $dH/dQ$) in its high pump head operation as shown in region a encircled by a broken line in FIG. 3.

Previously, such counterflow pumping characteristic has been dealt with by performing control of providing a sufficient margin particularly in the light of the scale of the net pump head so that the characteristic is overcome, i.e. such operating range of the counterflow characteristic cannot be approached.

Japanese Patent Unexamined Publication No. 62-186069 proposes controlling variable speed pumps wherein, when the load applied on the pump is increased, the driving input is first increased to increase the rotating speed and then the opening of the guide vanes is increased in order that the operating point (on the characteristic of the net pump head vs. the flow quantity) will never fall into the above mentioned range exhibiting the counterflow characteristic on the transient condition. Additionally, it is further proposed that when the load is decreased, the decreasing of the guide vane opening should be completed before the completion of decreasing the rotating speed although these operations are performed simultaneously. Thus, the proposed approach is preferably in overcoming the counterflow characteristic during the operation of only one pump.

However, when operating a pump in a plurality of pumping installations including a plurality of pumps each of which share at least one common pipeline, either upstream or downstream of the pumps, the net pumping head H of one pump rapidly increases by water hammer interference wave transmitted from the other pump through the common pipeline. Although there is a possibility of falling into the above-mentioned counterflow characteristic, the last mentioned proposed arrangement does not address such problems.

Japanese Patent Unexamined Publication No. 61-149583 proposes a method of activating a pump, in which, when the pump is activated, i.e. when the pump is brought from a shut-off state to a full variable-speed pumping state under the desired load, the rotating speed is increased in a stepwise manner in accordance with the gradually increased opening of the guide vanes, and, finally, a proper rotating speed and a proper guide vane opening are achieved under the desired load. However, this last proposed method does not take into account any particular manner of control after a variable-speed operation has been fully initiated. Further, the proposed control does not take into account the water hammer interference transmitted from another pump provided in a common pipeline.

A method of controlling the operation of a variable-speed pumping installation is also proposed in Japanese Patent Unexamined Publication No. 61-175271, in which the pump speed is controlled such that, when the water level reference, i.e. the total difference $H_g$, between the upper and lower reservoirs is in excess of a predetermined value $H_{pg}$, the rotating speed of the pump is corrected by increasing the rotating speed by an amount corresponding to the excess. That is, when $H_g < H_{pg}$, the pump is operated at a constant speed such that the rotating speed equal the predetermined value $N_0$, and when $H_G > H_P$, the pump is operated at the variable speed such as the rotating speed of $N_0 X (H_G/H_{PG})^{\frac{1}{2}}$ which merely shows an example of the function determining the relation of $H_G$ and N in a stationary state. Therefore, since the method of operating only one pump is disclosed therein, the method has no measures to the water hammer interference of the other pump sharing the common pipe line together with one pump.

Furthermore, Japanese Patent Unexamined Publication No. 53-147145 proposes an arrangement wherein, when a constant speed pump is shifted to the real pumping-up operation by opening a guide vane after priming hydraulic pressure is accomplished, the guide vane is not rapidly opened to a proper opening corresponding to a predetermined value $H_G$ so that the operating point of the pump does not fall into the counterflow characteristic but is kept in the hold state within the sufficient times just before proper opening of the guide vane.

Disadvantages of the prior art proposals reside in the manner of controlling the rotating speed and the guide vane opening to overcome the counterflow characteristics since such control is merely determined on the basis of behavior of only one pump and does not take into consideration problems relating to a pump sharing a common pipeline in the upstream or downstream side of the pump together with other machinery. Moreover, although there is a possibility of shifting an operation point of one pump into the counterflow characteristic due to the water hammer interference generated in the other machinery, the prior art does not provide an effective proposal overcoming the noted problems.

A further disadvantage of the prior art resides in the fact that no means are proposed for preventing the counterflow characteristic and continuing the pump operation when, for some reason, the operation point of the pump falls into the counterflow characteristic.

Furthermore, although the prior art proposals recognize that correctly determining whether or not the operation point of the pump falls into the counterflow characteristic is necessary to prevent damaging of the pump during operation in a counterflow condition, no proposals address the problem or provide a solution thereto.

To understand the counterflow characteristic of a pump, reference is made to FIG. 3 graphically illustrating a characteristic curve of a relationship between a pumped quantity Q and net pump head H of a pump with a guide vane opening maintained constant. On the characteristic curve shown in FIG. 3, the operation point of the pump shifts from a point $A_\alpha$ where the value of the pump head H is $H_\alpha$, to a point $A_\beta$ where the pump head value is $H_\beta$. Subsequently, a point $A_{\chi 1}$ where the value of the head H is $H_\chi$ has been reached, any increase in the value of the pump head H would result in a direct shift to a point $A_{\chi 2}$, causing a sudden decrease of the pumped quantity Q. Subsequently, the pumped quantity Q increases with an increase in the pump head H and a point $A_\Theta$ is reached, where the pump head value of $H_\Theta$ is reached.

The depth of the pump in the characteristic curve representing the counterflow, as shown in FIG. 4, will change in dependence upon the guide vane opening. In regions adjacent to such pump, even though this is not presented so distinct, the waterflow is unstable at the pump runner and therefore a similar problem, either serious or negligible, will be present. In FIG. 4 which, like FIG. 3, shows the relationship between the net pump head H and the pumped quantity Q, the curves are plotted with the guide vane opening Y being a parameter, with FIG. 4 showing $Y_1 > Y_2 > Y_3 > Y_4$. The cause of the counterflow characteristic will be described. That is, when the pump head becomes higher, a radial deviation occurs in the water flow through the pump runner, causing reversed water flows or counterflows 104 and 105, as shown in FIGS. 5 and 6. As shown in FIGS. 5 and 6, a pump includes a pump runner, with the runner including a band segment 102 and a crown portion 103. A vane 107 is provided having vane surfaces 107a, 107b. A counterflow 104 occurs in the runner 101 at the outlet port of the waterflow, and another counterflow 105 occurs at the inlet port.

Under such conditions, it is considered that the water flow may come off the vane surfaces 107A and 107B resulting in a so-called "stalling" state.

Therefore, the above mentioned prior art constructions had the same disadvantages as Japanese Patent Unexamined Publication No 53-147145.

SUMMARY OF THE INVENTION:

The aim underlying the present invention essentially resides in providing a method of detection and a method of control, which overcome the above-mentioned disadvantages of the prior art and enable secure detection of a counterflow characteristic when a pump or a pump turbine in a pumping installation such as a pumping-up power station is operated in pumping-up operation, a method of securely avoiding such that the operation point does not fall into the counterflow characteristic in the pumping-up installation having the common pump line used in the upstream or downstream together with other hydraulic machinery, and a further method of detection or method of control which enables getting out of the counterflow characteristic region to shift to the normal operation region even if the operation point of the pump falls into the counterflow characteristic region.

One of the above objects of the invention is achieved by controlling the guide vane opening of the pump sharing the common pipe line used in the upstream or the downstream together with other hydraulic machinery in the operation change of the other hydraulic machinery or prior to its change.

Another object of the invention is achieved by providing detecting means for determining that a pump has been shifted into a counterflow operation region, and applying a type of biasing control of temporarily increasing the rotating speed or temporarily decreasing the guide vane opening.

Yet another object of the present invention resides in providing a method of detecting secure operation in the counterflow characteristic by using the appearance of a predetermined hydraulic pressure spectrum in shifting the operation of the pump into the counterflow characteristic region as the change of hydraulic pressure int he discharge side of the pump is monitored.

Figure 1:
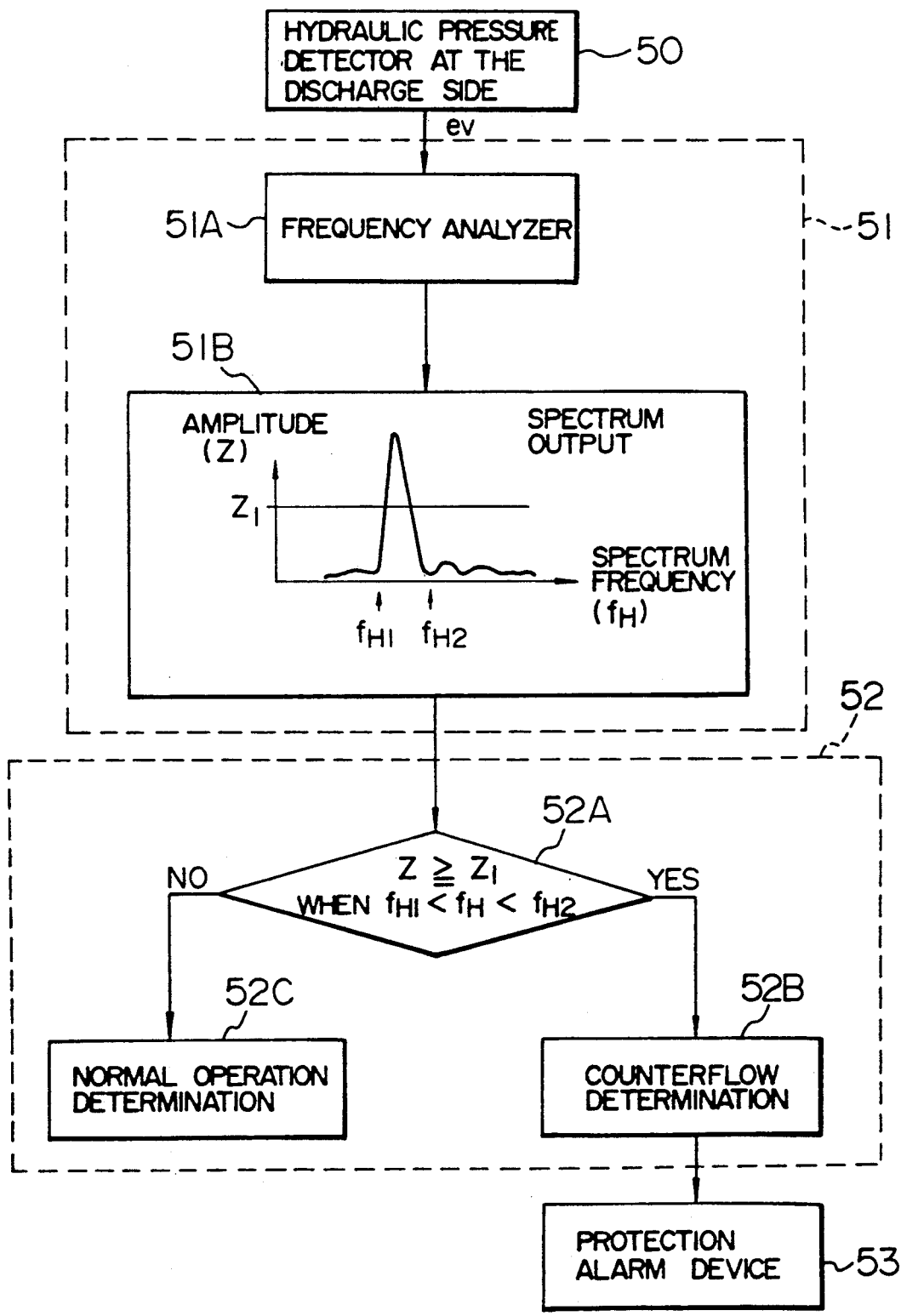
FIG. 1 is a control block diagram showing an embodiment of a method according to the present invention of detecting a counterflow through a pump.
Figure 5:
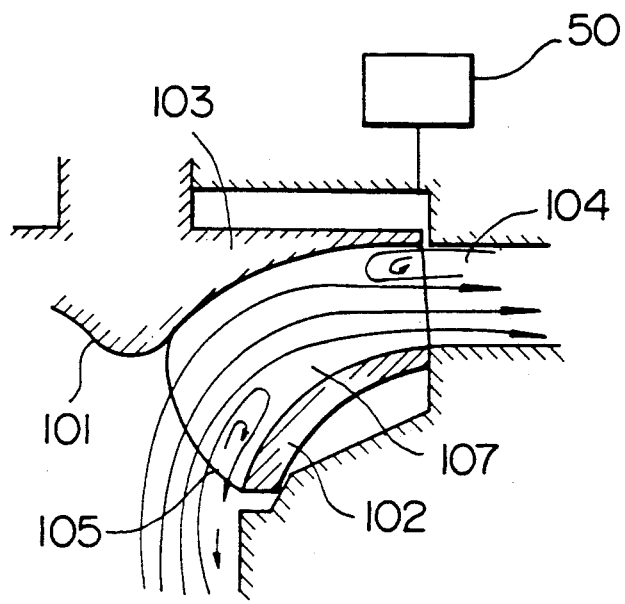
FIGS. 5 and 6 are illustrations showing the phenomenon of counterflow.

DETAILED DESCRIPTION OF PREFERRED EMBODIMENTS:

The first embodiment of the present invention is shown in FIG. 1, wherein a water pressure detector 50, disposed at a discharge side of a pump, is provided on an upper cover of a pump runner, as shown in FIG. 5.

A frequency analyzer 51 receives and frequency-analyzes an output signal $e_r$ from the water pressure detector 50 at its discharge side. The frequency analyzer 51 comprises a frequency analyzing portion 51A and a spectrum output portion 51B.

A counterflow determiner 52 comprises comparing means 52A, counterflow determining means 52B and normal operation determining means 52C. A protection alarm device 53 is also provided for providing an alarm signal.

When a pump is operating, the water pressure in a runner chamber and a portion communicated with the chamber will always pulsate. The pulsating pressure is detected by the water pressure detector 50 at the discharge side of the pump, which generates an output signal $E_v$ containing predetermined frequency components.

Figure 7A:
FIGS. 7A and 7B are diagrams showing waveforms of a detection signal.

The spectrum distribution of the frequency components contained in the water pressure variations at the discharge side of the pump during normal operation will generally lie in a relatively high frequency range of from 5 to 10 Hz, as shown in FIG. 7(a).

Figure 6:
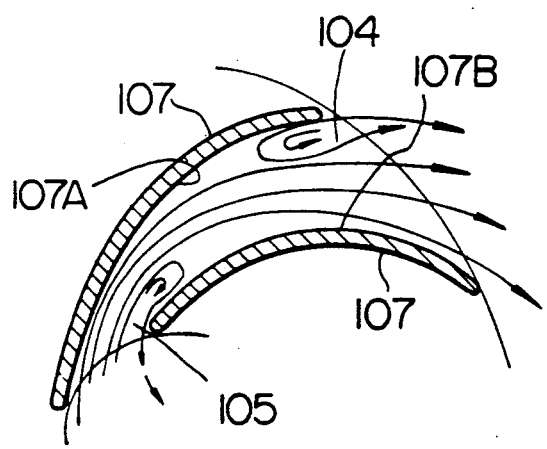
Figure 7B:

In an operation of a counterflow characteristic region, however, counterflows 104 and 105 will occur in the water flow through the pump casing as described with reference to FIGS. 5 and 6, and, therefore, relatively low frequency components of about 1 Hz having substantially high levels will be contained therein as shown in FIG. 7(b). Since the reverse water flows 104 and 105 occur in the water flow within the rotating pump runner as shown in FIGS. 5 and 6, it seems that they are unstable as to generating state and will periodically appear and disappear at a relatively low frequency of about 1 Hz, for example, but with a high level.

Thus, such spectrum components adjacent to about 1 Hz are extracted by the spectrum output portion 51B in the frequency analyzer 51. When the pump is operating normally, frequency components of higher than $f_{H2}$ are dominant in the spectrum distribution, but once the pump has fallen into a counterflow operation region, substantially high level components with a frequency range from $f_{H2}$ will occur with a high level and they are inputted to the determining means 51A which determines whether the frequency $f_H$ is within the predetermined range of from $f_{H1}$ to $f_{H2}$ and whether its amplitude level Z is higher than a predetermined value $Z_1$. A signal is given to the normal operation determining means 52C during normal operation, but the signal is directed to the counterflow determining means 52B once the counterflow operation region is reached, whereby the counterflow can be precisely detected. The detection of the counterflow will actuate the protection alarm device 53 thereby providing an alarm signal.

Thus, this embodiment enables an automatic monitoring and accurate detection of the occurrence of the counterflow at all times during pump operation.

Figure 2:
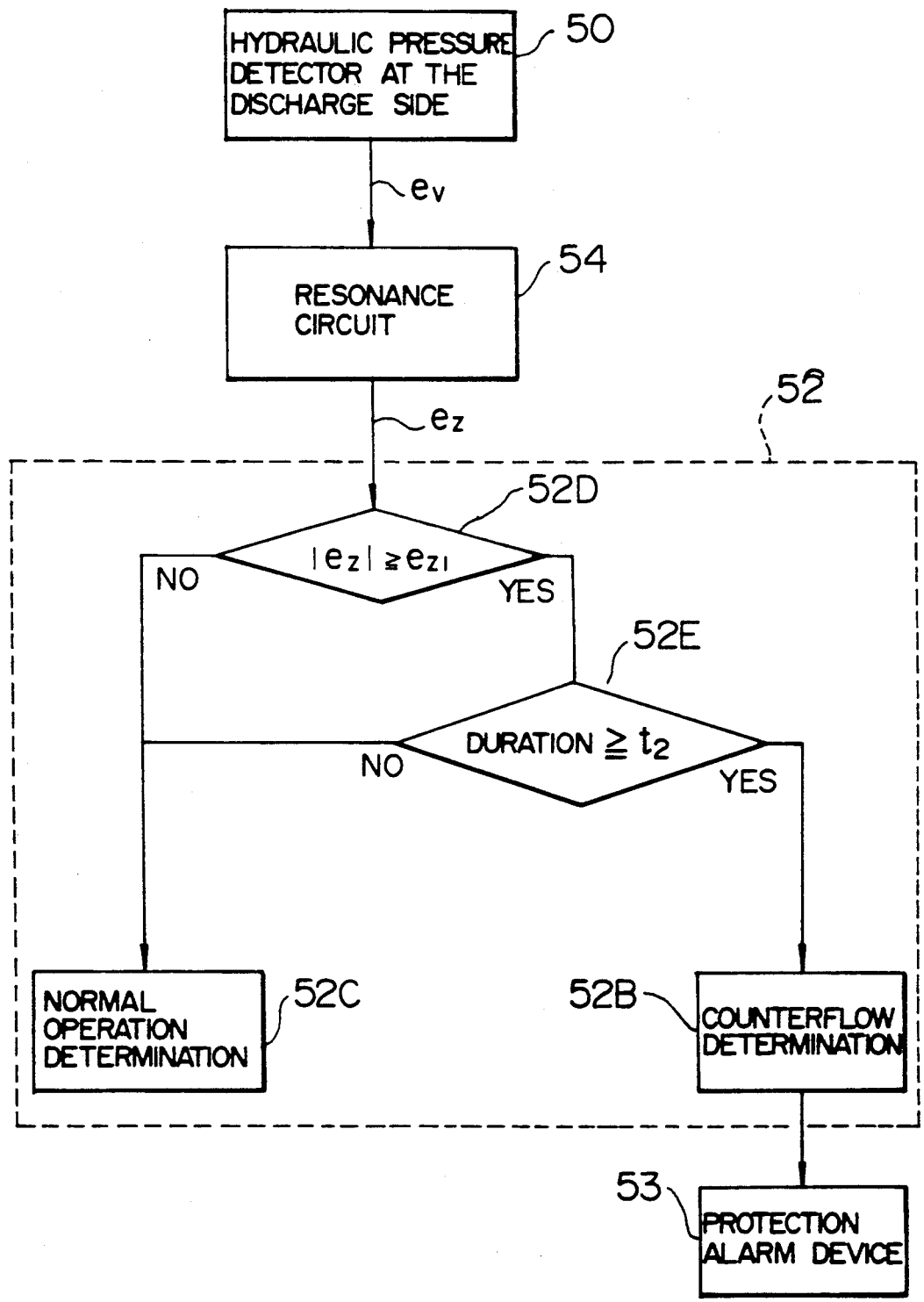
FIG. 2 is similar control block diagram showing another embodiment of a method of detecting a counterflow.

The embodiment of FIG. 2 emphasizes and extracts variations in the spectrum distribution due to the occurrence of a counterflow by a resonance circuit, instead of performing a frequency analysis. As shown in FIG. 2, a resonance circuit and determining means 52D, 52E are provided, with the remaining components being the same as the corresponding components in FIG. 1.

The resonance circuit 54 comprises an inductance of a coil or the like and a capacitor or the like, and is arranged to receive the signal $e_v$ from the work pressure detector 50 at the discharge side of the pump, and only emphasizes those signal components which are within the particular frequency range of from $f_{H1}$ to $f_{H2}$, and generate an output signal $e_z$.

The determining means 52D receives the signal $e_z$ and determines whether the signal level $|e_z|$ is higher than a predetermined value $e_{z1}$.

Similarly, the determining means 52E will determine on the condition that the level $|e_z|$ is higher than the predetermined level $e_{z1}$, whether the signal $e_z$ has the duration of more than a predetermined time interval $t_z$.

Thus, the second embodiment can also securely detect that fact that the pump operation has entered a counterflow operation region.

The spectrum frequency range of from $f_{H1}$ to $f_{H2}$ for the determination of an occurrence of a counterflow phenomenon must be suitably selected so as to correspond to each condition for the particular pump to which these embodiments are to be applied.

Figure 8:
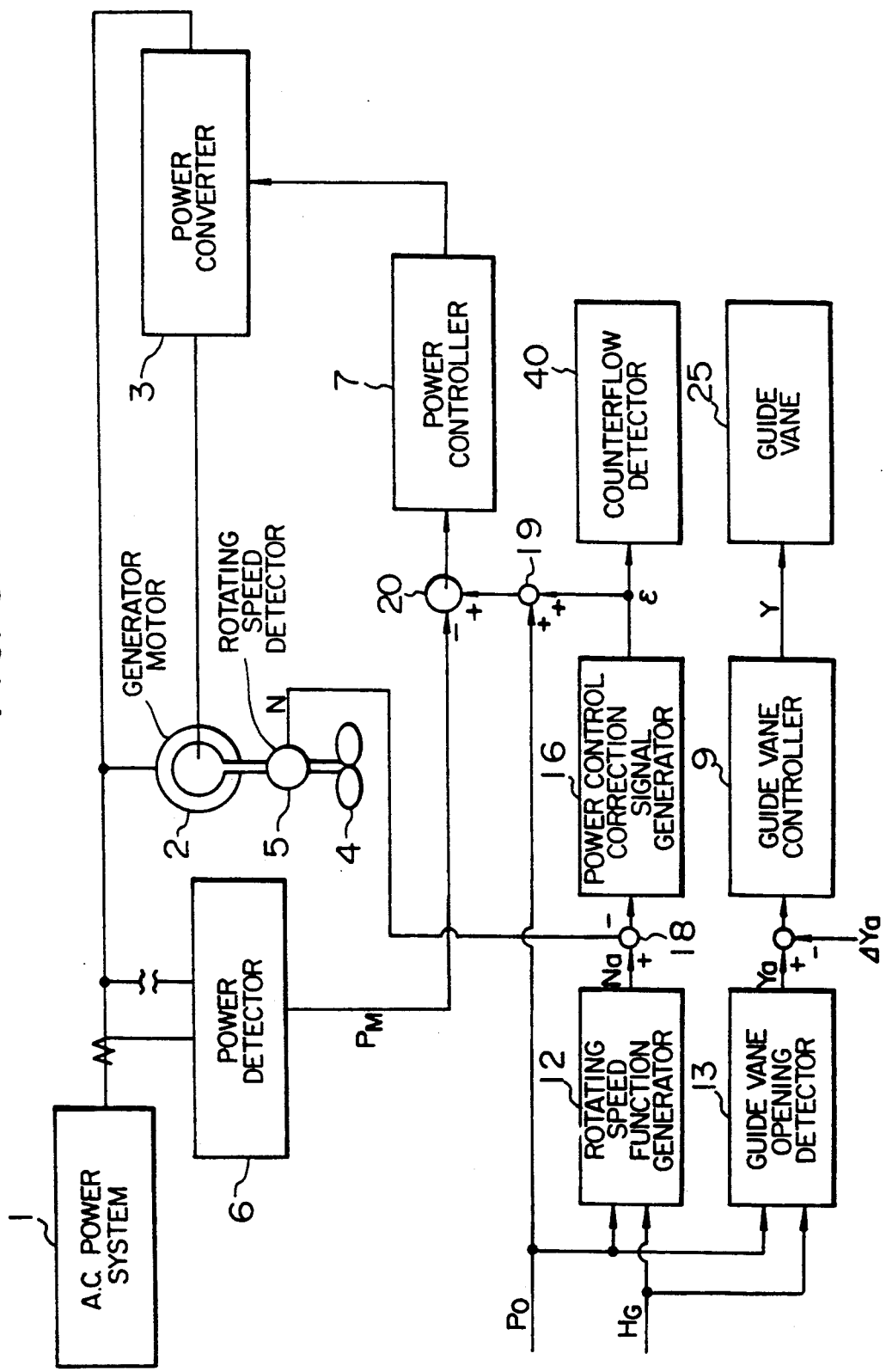
FIG. 8 is a block diagram of a system to which an embodiment of a method according to the present invention of controlling the pump operation in an pumping installation is applied.

In FIG. 8, an a.c. power system 1, a generator motor 2, a power converter 3, a reversible pump-turbine 4, a rotating speed detector 5, a power detector 6 and a power controller 7 are provided for a pump in a pumping-up installation. An a.c. exciting circuit for the control of power is not necessary for the explanation of this embodiment, and thus will not be described here.

Figure 9:
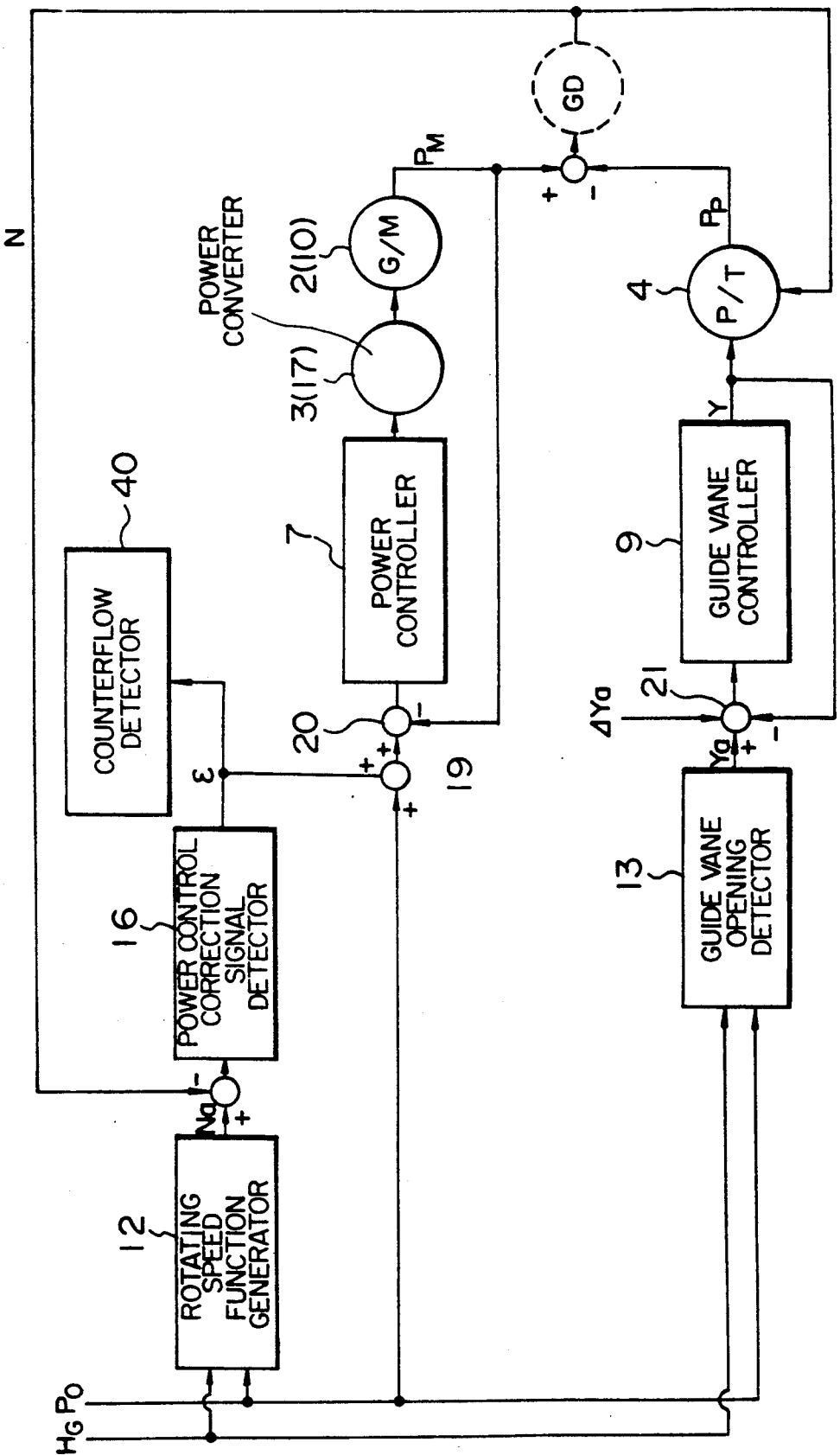
FIG. 9 is a similar control block diagram of a system according to the present invention.

In FIGS. 8 and 9, $P_o$ designates an externally given power command and 12 designates a rotating speed function generator, with the function generator 12 receiving the power command $P_o$ together with the level difference between the upper and lower reservoirs for the reversible pump-turbine 4, i.e. gross head $H_g$, and, at that time point, calculates the optimum rotating speed $M_a$.

The optimum rotating speed $N_a$ of the rotating speed function generator 12 and the real rotating speed N of the rotating speed detector 5 are compared with each other by an adder 18, and the difference therebetween is provided to a power control correction signal generator 16 for generating a correction signal $\epsilon$.

Therefore, a negative feedback loop control system for the control of the rotating speed is formed by the rotating speed function generator 12, the adder 18, the power control correction signal generator 16, the power controller 7, the power converter 3, the generator motor 2, and a moment of inertia $GD^2$. Here, the moment of inertia $GD^2$ represents the moment of inertia of all of the rotating parts including the generator motor 2 and the reversible pump turbine 4.

The correction signal $\epsilon$ generated by the power control correction signal generator 16 which includes an integrating element, is added to the power command $P_o$ by the adder 19 to form a resultant signal $P_o + \epsilon$ and this signal $P_o + \epsilon$ is compared with the real output $P_M$ from the generator motor 2 by an adder 20, with the result that the negative feedback loop control system for the control of power being formed which comprises the power controller 7, the power converter 3, the generator motor 2 and the real output $P_M$. Therefore, the power controller 8 is provided with an integrating element which is necessary to converge the deviation between the resultant signal $P_o + \epsilon$ and the real output $P_M$ to zero during normal operation.

A guide vane opening function generator 13 receives the above-mentioned power command $P_o$ and the gross head $H_G$ for calculating the optimum guide vane opening $Y_a$ at the time. The optimum guide vane opening $Y_a$ output from this function generator is added by adder 21 to a guide vane opening correction signal $\Delta Y_a$, and is further compared with the real guide vane opening Y which is the output from a guide vane controller 9, resulting in the formation of a negative feedback loop control system for the control of the guide vanes. Then, by the integrating element in the guide vane controller 9, the guide vane opening is controlled such that the deviation of the resultant value ($Y_a$, $\Delta Y_a$) from the real guide vane opening Y will converge to zero. Further, as will be described latter, the guide vane opening correction signal $\Delta Y_a$ becomes a predetermined value only when attempts are made to restore the operation from a counterflow operation condition, and will eventually reach a zero value when a normal operation is restored.

As described above, the above mentioned negative feedback loop control system for the control of the rotating speed calculates:

$$N = N_a,$$

and the negative feedback loop control system for the control of power calculates:

$$P_M = P_o + \epsilon.$$

Further, the above-mentioned negative feedback loop control system for the control of the guide vane opening calculates:

$$Y = Y_a + \Delta Y_a.$$

Thus, respective control values for normal operation are determined.

The deviation of a mechanical input $P_p$ into the reversible pump-turbine 4 from an electrical input $P_M$ supplied to the generator motor 2 may be considered to be input to the total momentum of inertia $GD^2$ arising from the rotating parts of these apparatus, and the momentum of inertia $GD^2$ may be considered as a type of integrating element.

Further, the negative feedback control system for the control of the rotating speed, comprising the rotating speed function generator 12, the adder 18, the power control correction signal generator 16, the power controller 7, the power converter 3, the generator motor 2 and the momentum of inertia $GD^2$, will feedback the real rotating speed N, so that the deviation between the mechanical input $P_p$ and the electrical input $P_M$ will tend to become zero.

That is, during normal operation, the following relationship exists:

$$P_M = P_o.$$

Further, if the error of the above-mentioned function generator is negligible (it can be made very small), then $Y_a = P_o$, so that $P_p$ would be controlled to be equal to $P_o$, i.e. it must be controlled to be $P_p = P_o$.

The above may be arranged into the following relationship:

$$P_o = P_p = P_M = P_o + \epsilon.$$

Thus, the power correction signal $\epsilon$ will be ultimately converged to zero, so that the real input $P_M$ can be controlled in accordance with the externally given power command $P_o$.

Next, the method of controlling the operation of a pump having a common pipeline used in the upstream or downstream together with other hydraulic machinery according to the present invention will be described.

Figure 10:
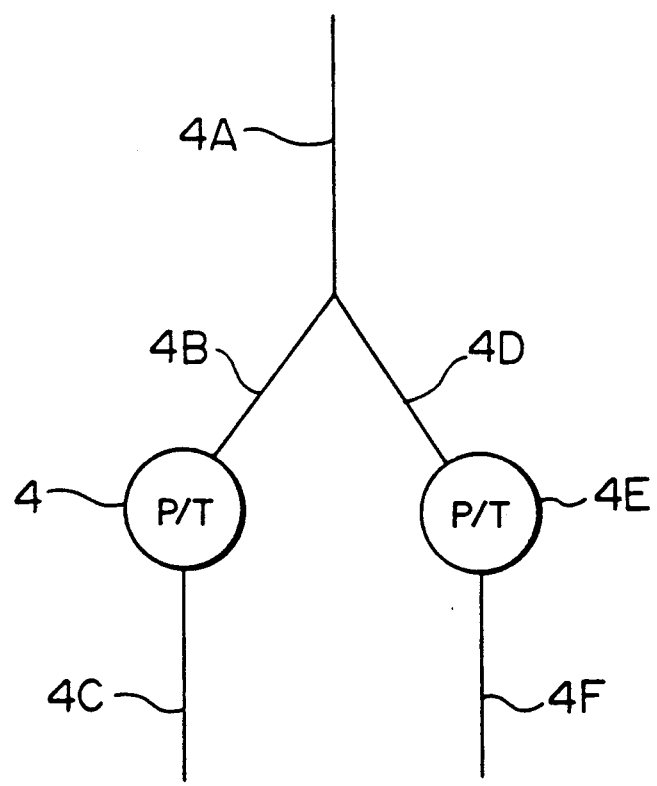
FIG. 10 is an illustration of a pipe line including a common pipe line.

As shown in FIG. 10, a variable speed pumping-up power plant to which the present invention is applied comprises a plurality, for example, two reversible pump turbines 4. For example, the reversible pump turbine 4E is installed as two pumps totally. Those pumps share at least a portion of their pipe lines, and which have a common pipe line 4A and branch pipe lines 4A and 4D, with pipe lines 4C, 4F being located downstream.

Figure 4:
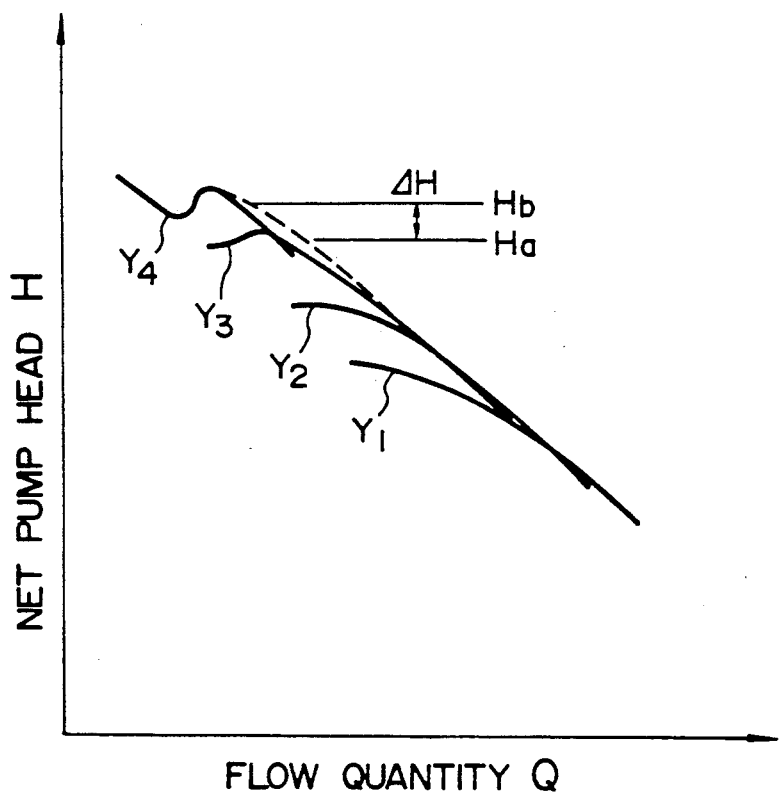
FIG. 4 is a graph showing an operating characteristic of a pump including a counterflow characteristic.

When one of the reversible pump turbines 4 and 4E, for example, the pump turbine 4E, starts pumping-up in a pumping-up mode while the other pump turbine 4 is pumping-up, or control is effected to suddenly change the pumping-up quantity during pumping-up operation, or control is effected to suddenly change its output while it is operating in a hydraulic turbine mode, then the hydraulic pressure in the branch pipe line 4D, connected to the pump turbine 4, will change suddenly. Then, the change in pressure in the branch 4D is propagated into the other branch pipe 4B, with the result that the net pump head H for the reversible pump turbine 4, which is then in a pumping-up operation, may be increased by $\Delta H$ from $H_a$ to $H_b$, as shown in FIG. 4.

Figure 3:
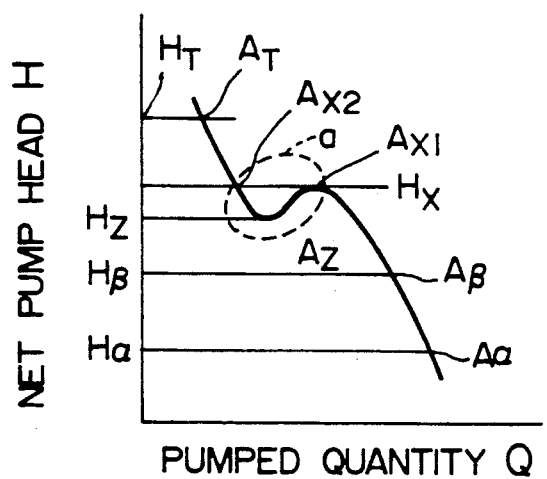
FIG. 3 is a graph showing a counterflow characteristic.

As previously described in conjunction with FIG. 3, pumps have operating characteristics containing a counterflow operation characteristic, so that there is a possibility that the above-mentioned change in pressure will cause the operation of the reversible pump turbine 4 to flow into a counterflow operation region. In other words, if the guide vane opening of the pump turbine 4 is $Y_3$ in FIG. 4, then the above-mentioned change $\Delta H$ in pump head due to the other pump turbine 4E will cause the operating point of the pump turbine 4 to soon fall into the counterflow operation region.

Figure 11:
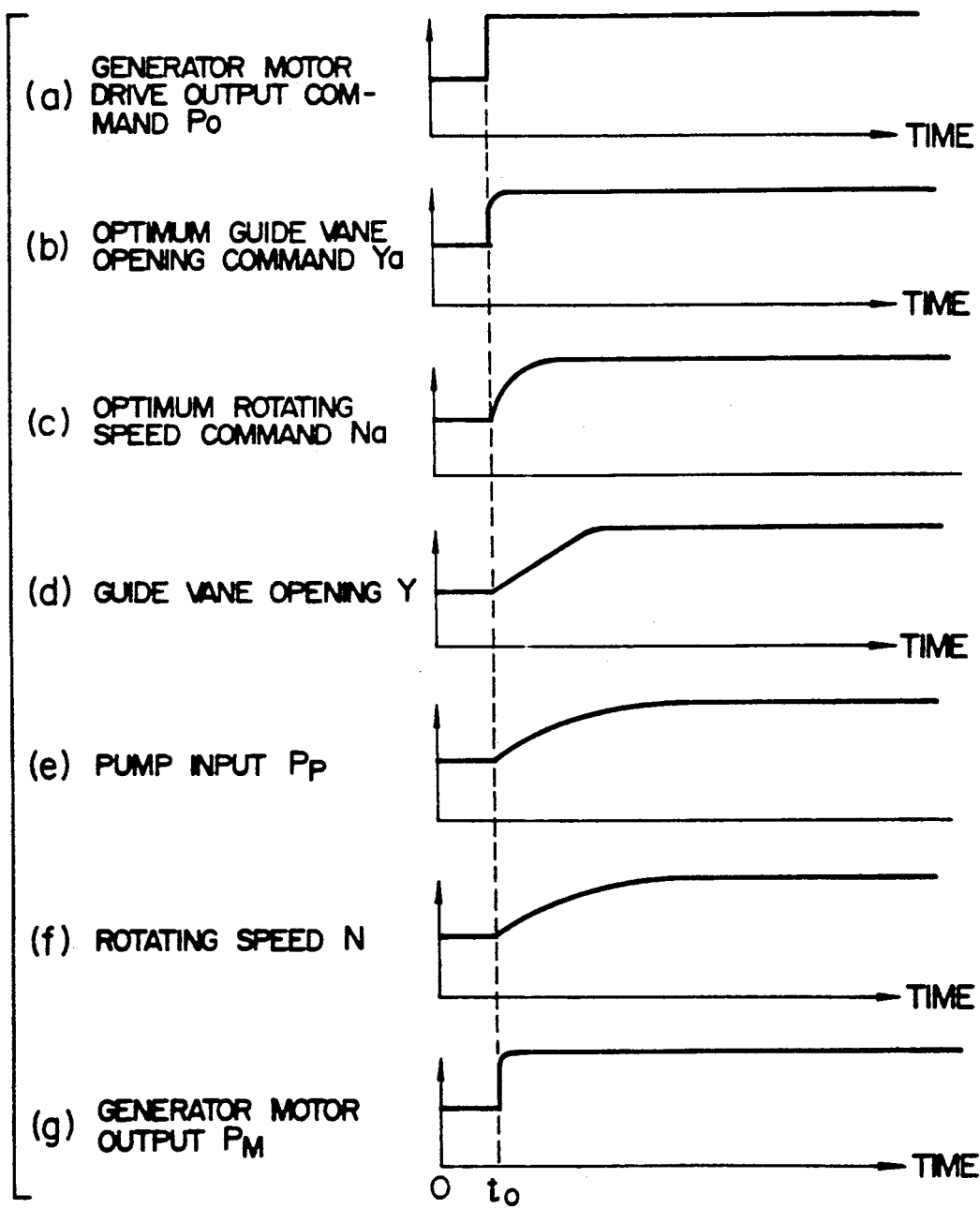
FIG. 11 is a timing chart for explaining operation.

In a normal operation, as shown in FIG. 11, if a generator motor drive output command (power command) $P_o$ is raised stepwise at a time point $t_o$ as shown in FIG. 11(a), then the motor output $P_m$ will rise in response thereto with little time lag as shown in FIG. 11(g).

As shown in FIGS. 11(b)-(f), an optimum guide vane opening command $Y_a$, optimum rotating speed command $N_a$, guide vane opening Y, pump input $P_p$, and rotating speed N will also respond thereto. First, the response of the guide vane opening Y to the optimum guide vane opening command $Y_a$, shown in FIG. 11(d), includes a rectilinear portion because the opening or closing speed of the guide vanes is limited by the speed of response of a servo system. The limitation of speed is limited by the stroke of a distributing valve in a hydraulic servo system.

The rotating speed N of the pump is accelerated by the difference between the motor output $P_M$ of FIG. 11(g) and the pump input $P_p$ of FIG. 11(e) and will increase as shown in FIG. 11(f) and will finally become constant after $N = N_a$ has been achieved. The pump input $P_p$ also gradually increases as shown in FIG. 11(e), since the increasing part in the guide vane opening Y and the increasing part in the rotating speed N are added to the pump input $P_p$.

In FIG. 11(f), the rotating speed N will gradually change in a stable manner due to the fact that a substantial damping function is give to the power control correction signal generator 16. To achieve this, the power control correction signal generator 16 should comprise a parallel circuit of a proportional element and an integrating element and have a suitably selected value of the gain to be achieved by them.

Figure 12:
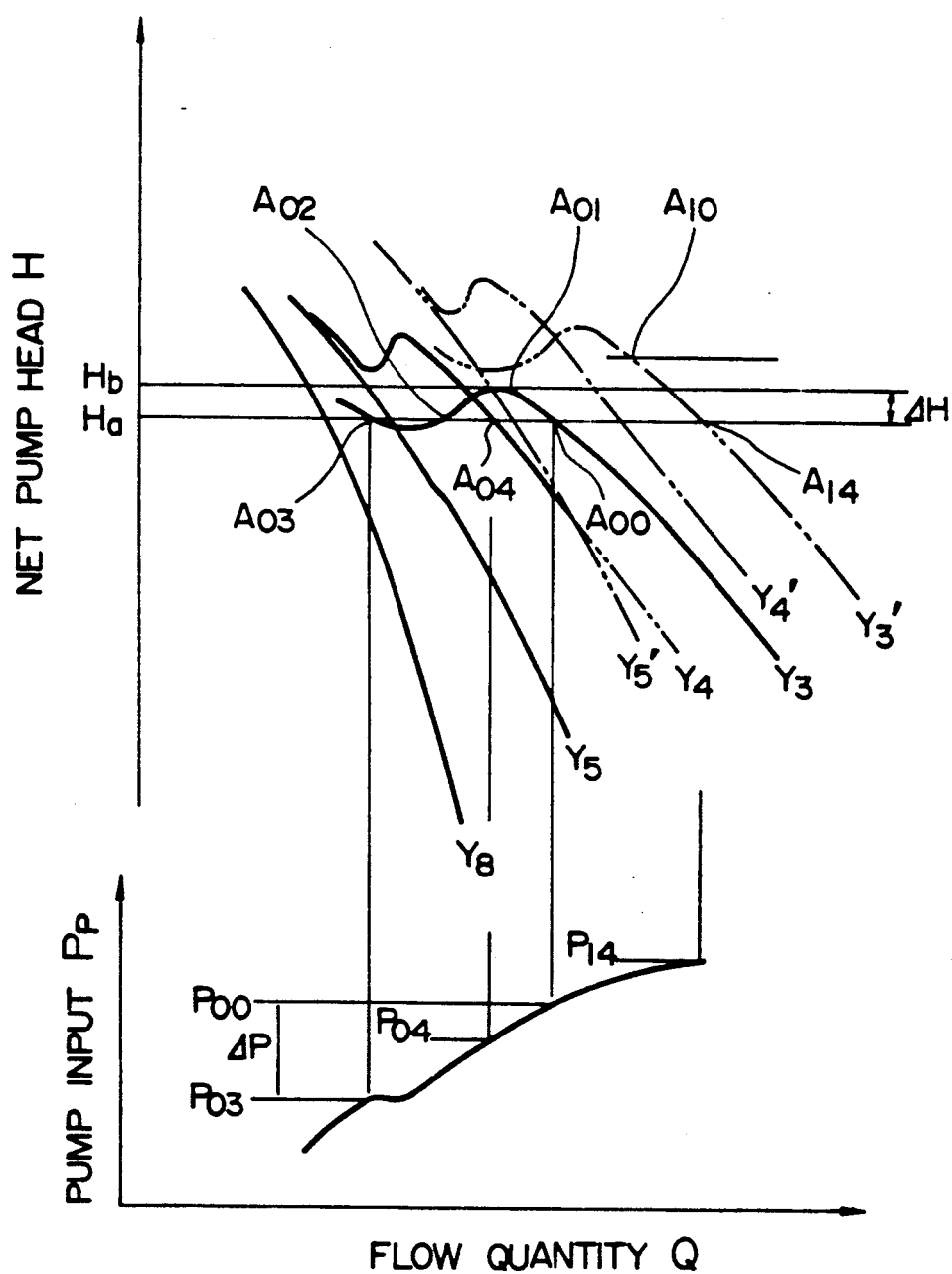
FIG. 12 is a graph showing a controlling characteristic.

Next, presuming that the pump turbine 4 has fallen into the counterflow characteristic region due to a hydraulic pressure variation $\Delta H$ caused by the other pump turbine 4E. That is presumed that pumping, i.e. the pump turbine 4 operating with a guide vane opening $Y_3$ has fallen from an operating point $A_{00}$ to an operating point $A_{03}$ as shown in FIG. 12.

This is because once the pressure variation $\delta H$ will cause the operating point to move along the characteristic associated with the guide vane opening of $Y_3$ to a point $A_{01}$, then the operating point can move either of the operation point $A_{00}$ and the operation point $A_{02}$ since the operating point $A_{01}$ is a maximum when the pressure variation $\delta H$ has disappeared and the original pump head $H_a$ has been restored. If the operating point moves to the point $A_{02}$, it will soon further move to the point $A_{03}$ due to the operating point $A_{02}$ being an unstable point. The region adjacent to this operating point $A_{02}$ was already described as the counterflow operation region.

Then, the control by the power control correction signal generator 16 including the integrating element is still continued, and the operating condition of $N=N_a$ is still maintained, so that the condition $Y=Y_a$ is also maintained. The pump input $P_p$, however, has automatically decreased by $\Delta P$ from $P_{00}$ in the mean time, so that the following relation exists:

$$P_p = P_{00} - \Delta P = P_M = P_o + \epsilon.$$

That is, though $\epsilon=0$ holds during normal operation, $\epsilon = \Delta P$ now appears.

In one embodiment of the present invention, the magnitude of "$\epsilon$" is monitored to detect the counterflow, and predetermined control is performed depending on the result of such monitoring in order to avoid the continuance of the pumping operation in the counterflow operation region. More generally speaking, the presence of a counterflow is determined by performing an inverse operation using a combination of the motor output $P_M$ or a signal corresponding thereto, the rotating speed N or a signal corresponding thereto, and the guide vane opening Y or a signal corresponding thereto.

Figure 13:
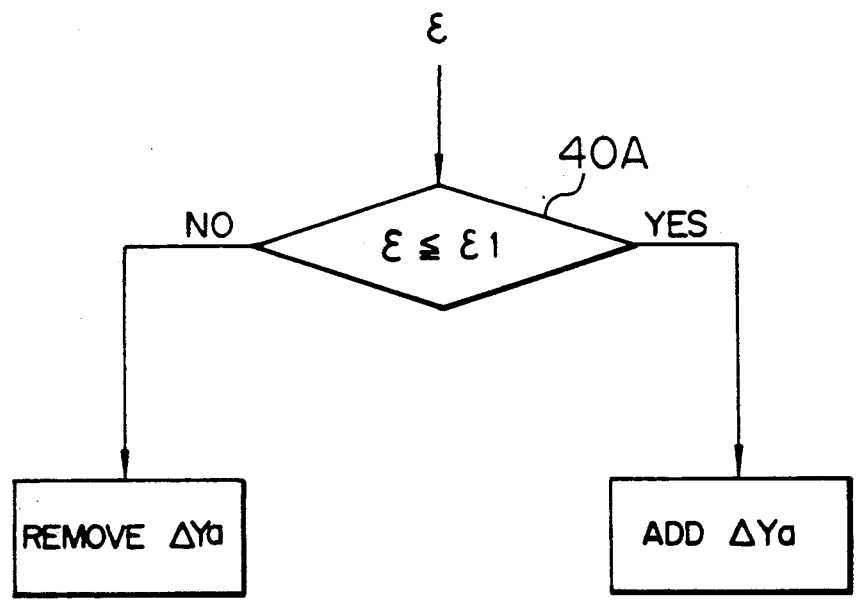
FIG. 13 and 14 are block diagrams showing embodiments of detecting means.

FIG. 13 shown an embodiment of such inverse operation, in which a logical decision 40A is performed to determine whether $\epsilon$ is larger or smaller than a predetermined value $\epsilon_1$, in order to determine whether the escape signal $\Delta Y_a$ should be added or removed.

Figure 14:
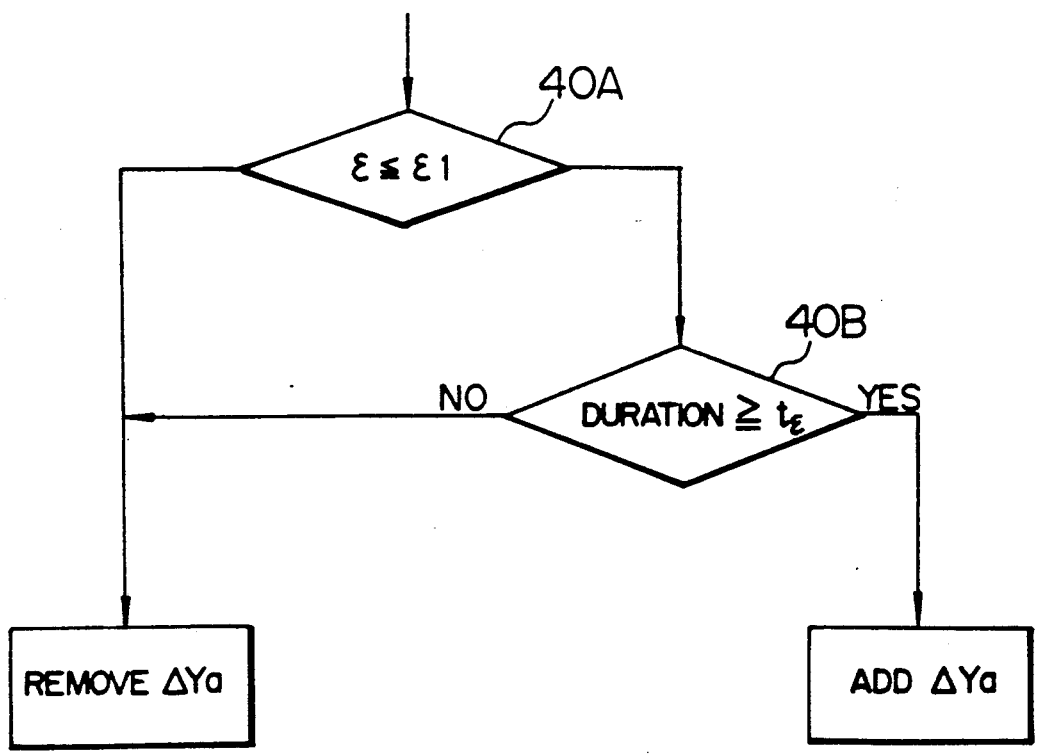

FIG. 14 shows another embodiment of the decision of the presence of a counterflow, in which, after the logical decision 40A, another logical decision 40B is performed to determine whether the escape signal $\Delta Y_a$ should be added or removed on a condition that the duration of an abnormal value of $\epsilon$ is longer than a predetermined time period $t_\epsilon$.

The manner of control using the escape signal $\delta Y_a$ will now be described.

In FIGS. 8 and 9, the detection of a counterflow is performed by a counterflow detector 40, and the occurrence of the counterflow characteristic operating is determined in the manner shown in FIG. 13 or 14. The escape signal $\Delta Y_a$, generated due to the occurrence of the counterflow characteristic operating, is subtracted as the guide vane opening correction signal $\Delta Y_a$ from the optimum guide vane opening $Y_a$ generated by the guide vane opening function generator 143 (FIGS. 8 and 9).

As above-mentioned, since, at that time, the operating condition of the pump turbine 4 is on the characteristic curve associated with the guide vane opening of $Y_3$ in FIG. 12, and since the presence of a counterflow has been detected, the operating point of the pump turbine 4 has moved from the previous point $A_{00}$ to point $A_{03}$ and the input $P_F$ to the pump turbine is also on point $P_{03}$.

Then, since the guide vane opening correction signal $Y_a$ is subtracted and the guide vane opening is decreased from $Y_3$ to $Y_4$, the operating condition of the pump turbine 4 will change from the characteristic associated with the guide vane opening value $Y_3$ to an operating condition associated with the guide vane opening value $Y_4$ in FIG. 12, so that the operating point also moves from point $A_{03}$ to point $A_{04}$ and the pump turbine input $P_p$ moves from point $P_{03}$ to point $P_{04}$.

Most of these changes will occur when the QH characteristic curve passes the guide vane opening value where it returns from a 3-valued function to a single valued function under the condition of $H=H_a$.

The operation performed when the guide vane opening is intentionally throttled by $\Delta Y_a$ will be described with reference to FIG. 15.

Figure 15:
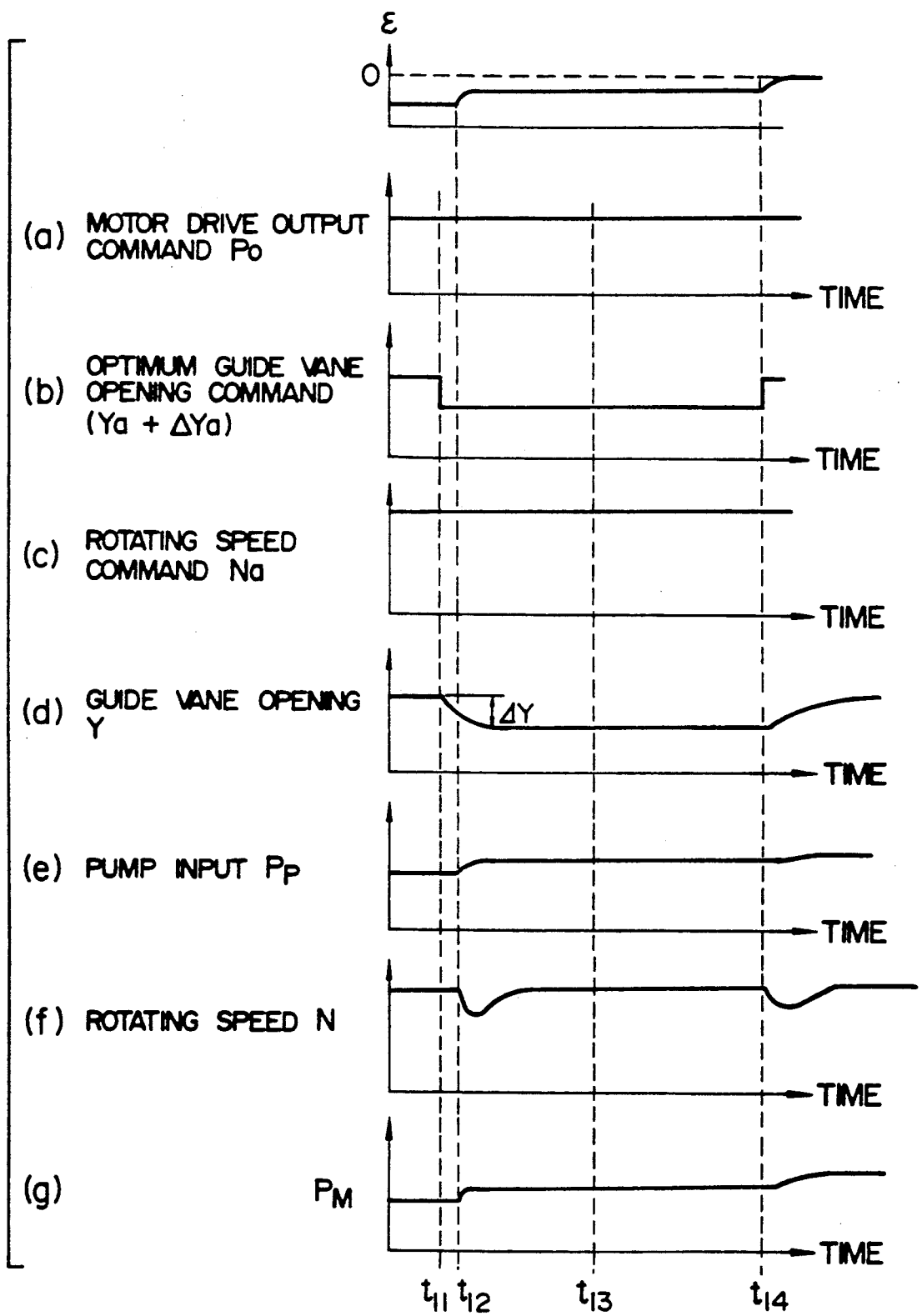
FIG. 15 is a timing chart for explaining operation.

In FIG. 15 the throttling of the guide vane opening Y is started at time point $t_{11}$. At a following point in time $t_{12}$, the QH characteristic curve will return from a 3-valued function to a single valued function under the condition of $H=H_a$, and the input $P_p$ to the pump turbine 4 will suddenly increase. This is shown in FIGS. 15(d) and 15(e).

Then, the output $P_M$ of the generator motor 2 will naturally follow the input $P_p$ to the pump turbine 4 but with a little lag, with the result being that the rotating speed N will temporarily decrease but will soon return to $N=N_a$ by virtue of the response of the control system as shown in FIG. 15(f).

At the above-mentioned time point $t_{12}$, the guide vane opening correction signal $\Delta Y_a$ is removed and the guide vane opening is thus gradually increased to the original opening $Y_3$, whereby the operating point is returned from the point $A_{04}$ on the characteristic curve associated with the guide vane opening value $Y_4$ to the point $A_{00}$ on the curve associated with the guide vane opening value $Y_3$ so that the normal operating condition can be restored from the counterflow operating condition.

In this embodiment, therefore, if the pump turbine 4 falls into the counterflow operating condition, then such fact is automatically detected, and the guide vane opening is then automatically throttled and, subsequently, the initial opening is automatically restored, whereby a stable operation can be allowed to continued.

Figure 16:
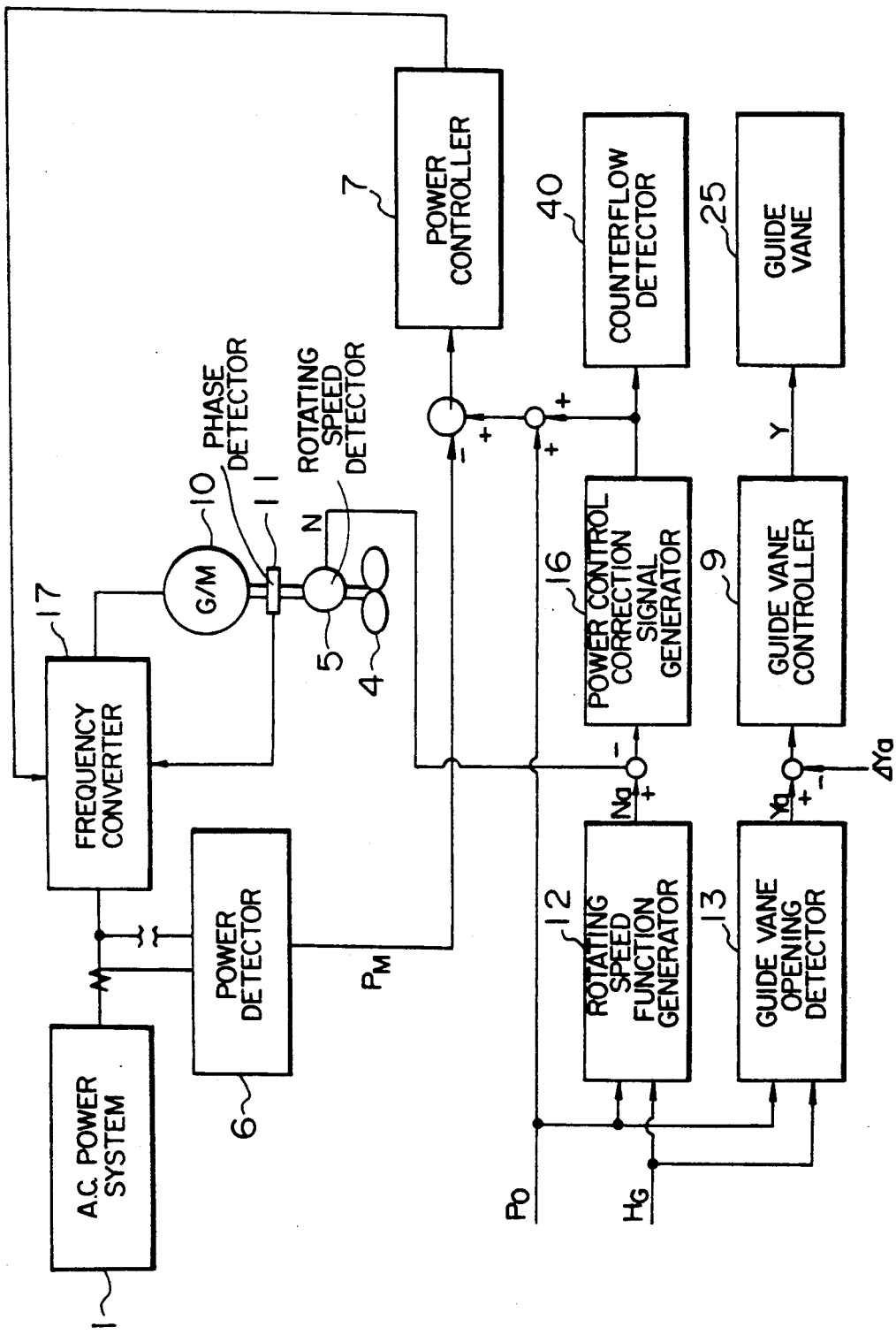
FIGS. 16 and 17 are block diagrams of systems to which an embodiment of the present invention is applied.

Turning now to FIG. 16, there is shown an embodiment in which a method of escaping a counterflow condition by using the above-mentioned guide vane opening correction signal $\Delta Y_a$ is applied to a pumping plant using a primary exciter type variable machine. In FIG. 16, a power detector 6, a synchronous motor 10, a phase detector 11, and a frequency converter 17 are provided in a primary circuit. The other components are the same as shown in FIG. 8.

This embodiment, therefore, is different from the embodiment of FIG. 8 only in that it uses, instead of the secondary-excited variable speed generator motor 2, a synchronous motor 10 which is variable-speed operated by primary excitation.

Figure 17:
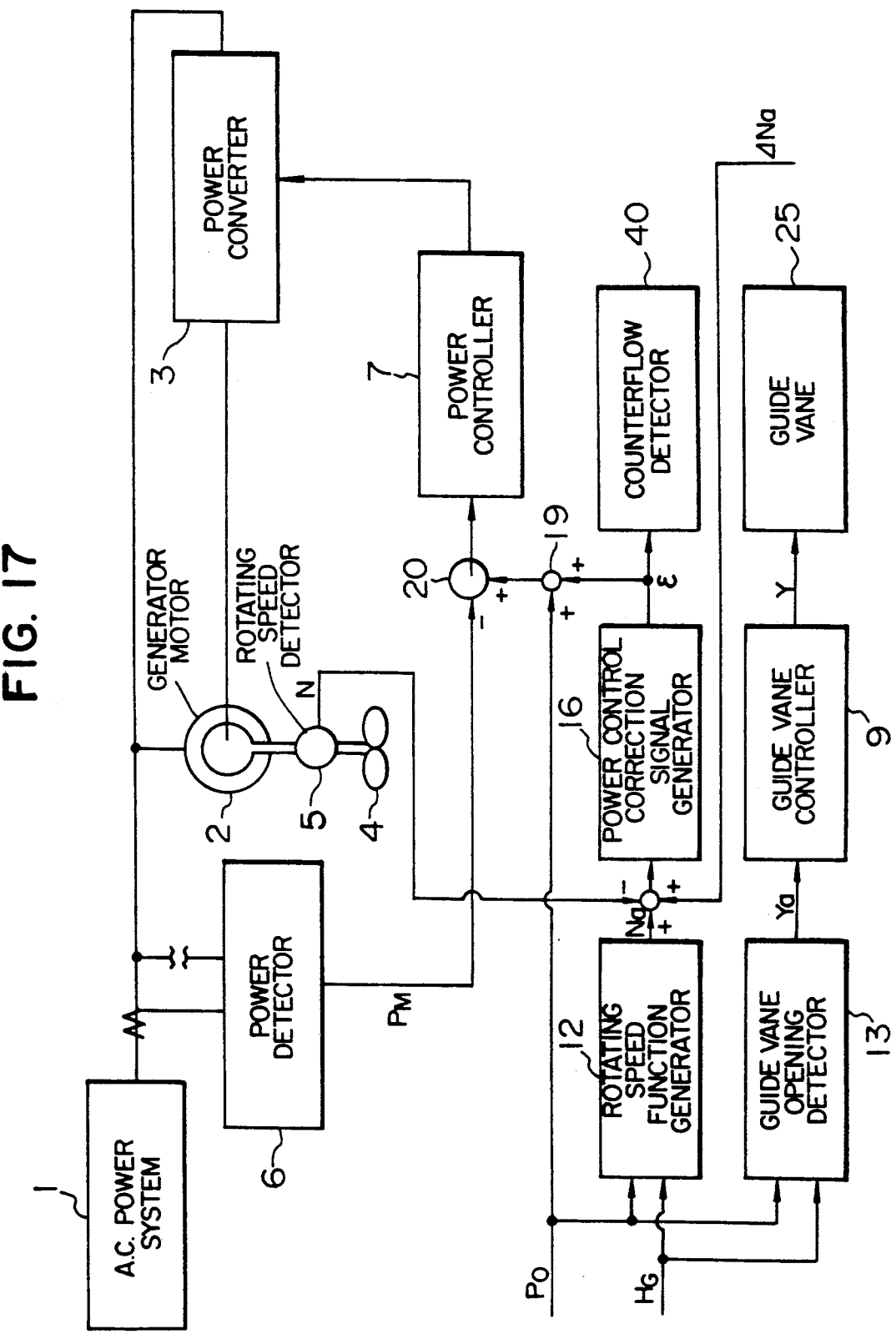
Figure 18:
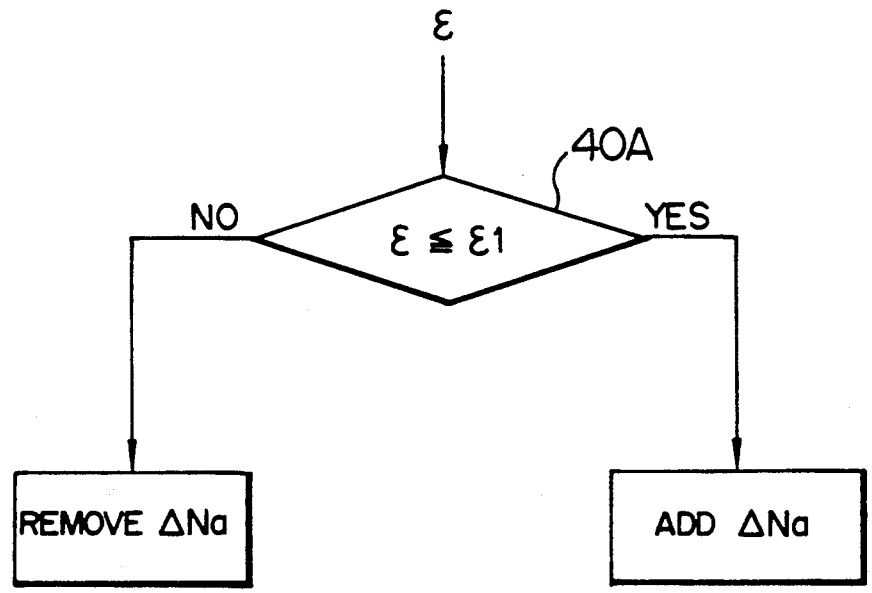
FIGS. 18 and 19 are block diagrams showing other embodiments of the detecting means.
Figure 19:
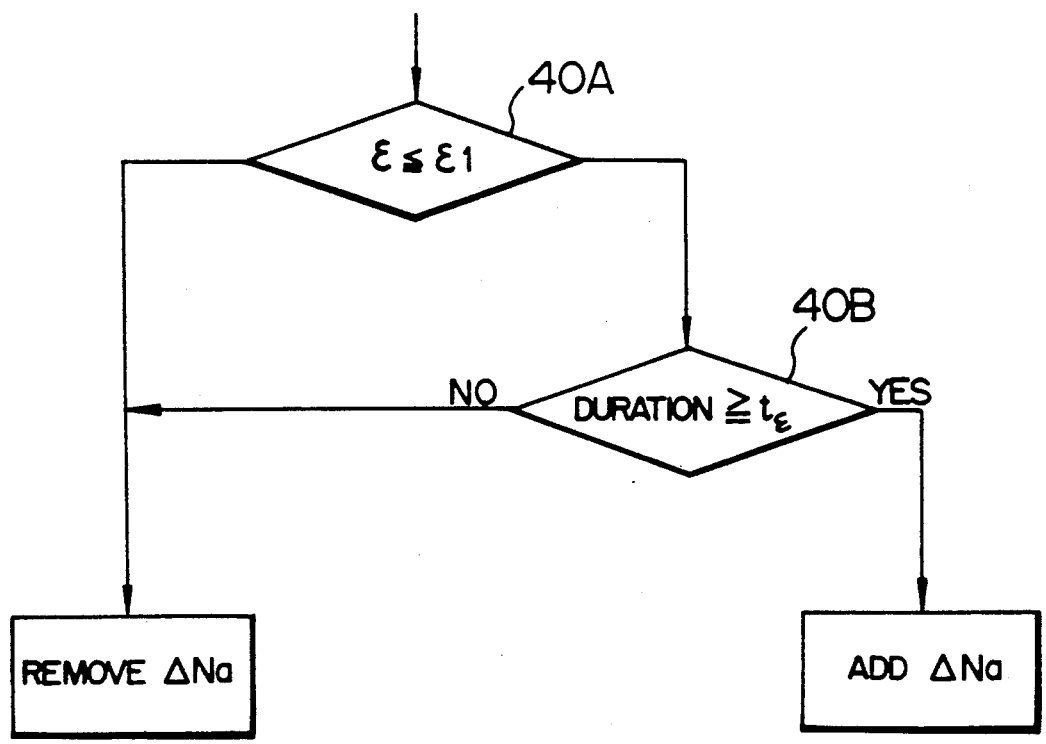

FIG. 17 shows another embodiment of the method of escaping a counterflow condition according to the present invention, in which the rotating speed N is varied instead of varying the above-mentioned guide vane opening signal $\Delta Y_a$. The escape signal $\delta N_a$ is used as a rotating speed correction signal. When the counterflow detector 40 has detected the occurrence of a counterflow operation condition, the escape signal $\Delta N_a$ is generated in accordance with either one of the methods shown in FIGS. 18 and 19 in order to decrease the optimum rotating speed $N_a$ by a predetermined value. Since the FIGS. 18 and 19 correspond to FIGS. 13 and 14, respectively, they will now be particularly described.

Consequently, the rotating speed N of the pump turbine 4 will increase by the value of the escape signal $\Delta N_a$, the QH operation curve will move upward and to the right to that curve associated with $Y_3'$, as shown in FIG. 12, the operating point will suddenly increase from point $A_{03}$ to $A_{14}$ under the condition of $H=H_a$, and the input $P_p$ to the pump turbine 4 will suddenly increase to $P_{14}$. The most of these changes is generated when the rotating speed N will change past a value where the QH characteristics under $H=H_a$ returns from a two-valued function to a single valued function.

Figure 20:
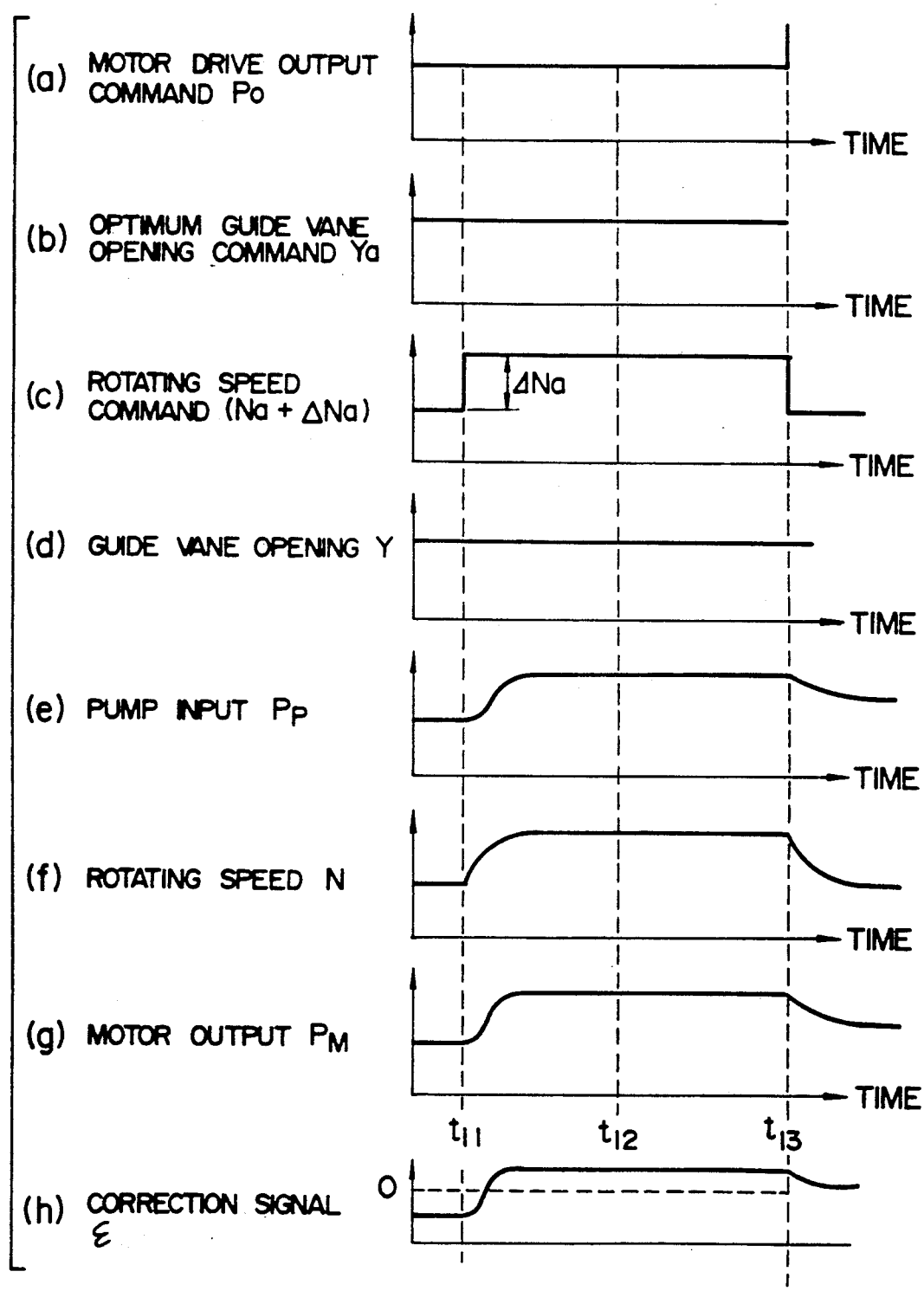
FIG. 20 is a timing chart for explaining operation.

As shown in FIG. 20(c), the escape signal $\Delta N_a$ is added to the rotating speed command $N_a$ at the point $t_{11}$, whereby the power control correction signal generator 16 will increase the motor output $P_M$ to increase the rotating speed N as shown in FIG. 12(g). As the rotating speed N increases as shown in FIG. 12(f), the input $P_p$ to the pump turbine 4 also increases. The magnitude of the escape signal $\Delta N_a$, which is a predetermined value, should be selected to a value which enables a secure escape from a counterflow characteristic operation under all conditions. Therefore, the motor output $P_M$ will be slightly larger than $P_0$, and the correction signal $\epsilon$ will have a positive value.

Subsequently, at time point $t_{13}$, the escape signal $\Delta N_a$ is removed to gradually decrease the rotating speed N to the former value $N_a$, whereby the operating point will return from $A_{14}$ to $A_{00}$, the input $P_p$ to the pump turbine 4 will also return from $P_{14}$ to $P_{00}$ and a normal operating condition can be restored.

Figure 21:
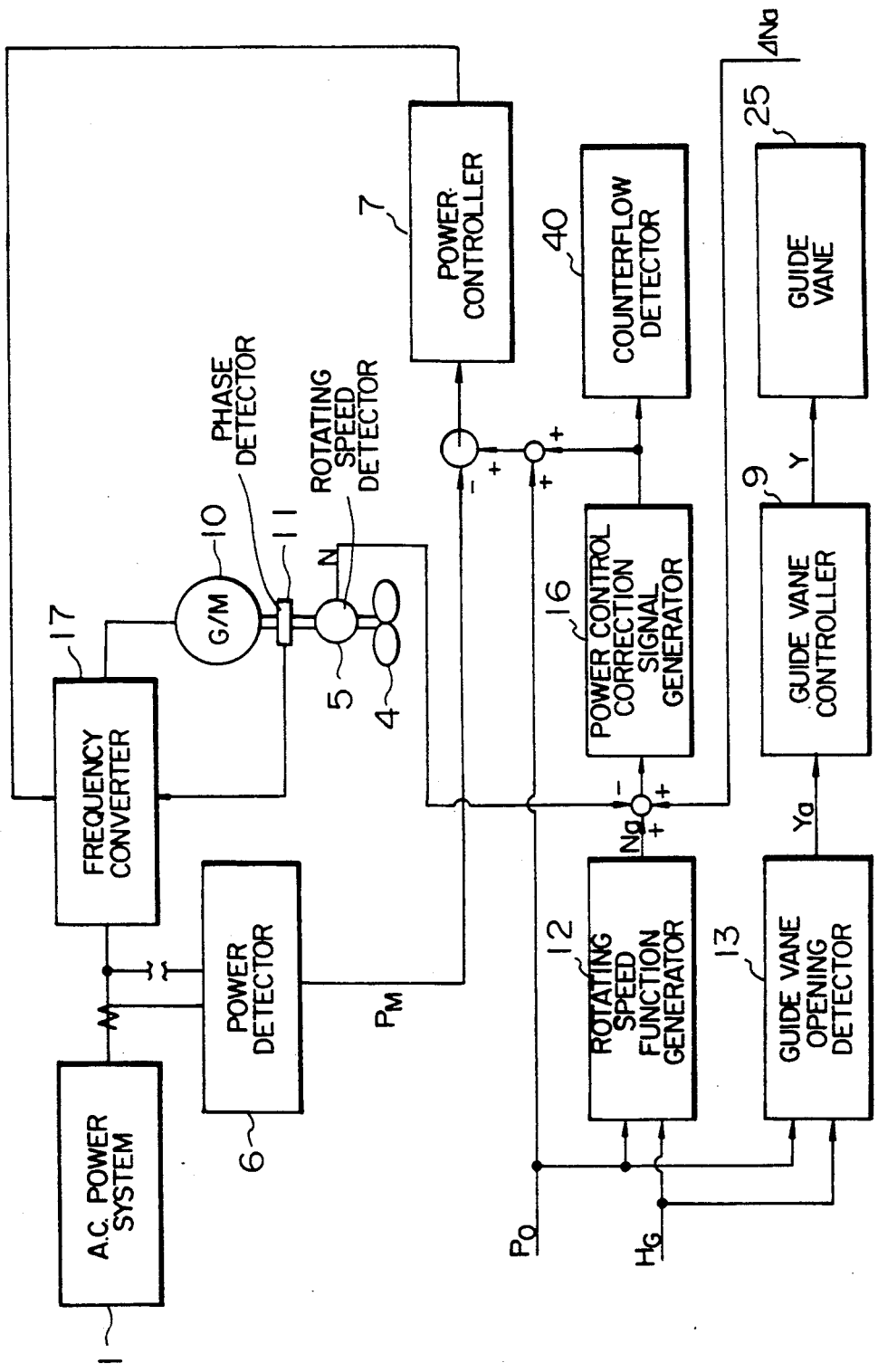
FIG. 21 is a block diagram showing another example of a system to which the present invention is applied.

The embodiment of FIG. 17 shows an embodiment using as the generator motor 2 a secondary-excited variable speed machine. On the other hand, FIG. 21 shows another embodiment which uses a primary-excited variable speed generator motor 10. This embodiment is similar to that of FIG. 16.

All of the embodiments shown in FIGS. 8-21 are arranged such that, upon detection of the occurrence of a counterflow operating condition, the operating condition of the pump turbine is forced to change from the current operation command value by a predetermined value. This manner of control is defined as a biasing control.

Next, an embodiment of the present invention will be described which is applicable to pumping-up installations where a plurality of pumps and other hydraulic machinery share at least one of their upstream or downstream pipe lines. In this embodiment, the control responding on the change of the operating manner to the other machinery is also introduced into the pumping-up installations, thereby allowing avoidance of falling into the counterflow characteristic operating condition to be made sure.

As previously described, a pump or a pump turbine is considered to share a common pipe line 4A together with other hydraulic machinery (this may be not limited to be a pump) as shown in FIG. 10. In this case, the pump (or the pump turbine) is incorporated into the system shown in FIGS. 8 and 9. Both of the pump turbines 4 and 4E will be described as the same ones in the following description. At the present time, if the operation is effected such that the other pump 4E is started in the pumping-up mode during the pumping-up operation of one pump turbine 4, an amount of pumping-up water is suddenly increased during the operation of the pumping-up mode, the output is suddenly decreased in the turbine mode, or the like, there occurs a danger that the hydraulic turbine 4 falls into the counterflow operating condition according to the suddenly increasing of the hydraulic pressure in the upper stream pipe line, as also previously described.

In view of this, the embodiment to be described is arranged to perform a control operation such that when the operating condition of one pump turbine, for example, a pump turbine 4E, in a plurality of pump turbines is to be changed while the other pump turbine 4 is operated in a pumping-up mode with the guide vane opening value $Y_3$, the guide vane opening of the other pump turbine 4 is temporally throttled by a predetermined value $\Delta Y_a$ from $Y_3$ to $Y_4$, at the same time with or prior to such desired change. That is, the operating characteristic is temporally changed from the characteristic curve $Y_3$ to $Y_4$ in FIG. 12.

Then the predetermined value $\Delta Y_a$ may be one having constant width, or may also be a variable value which is determined by a predetermined function of the change in operation of the pump turbine 4E which caused the control operation.

Figure 22:
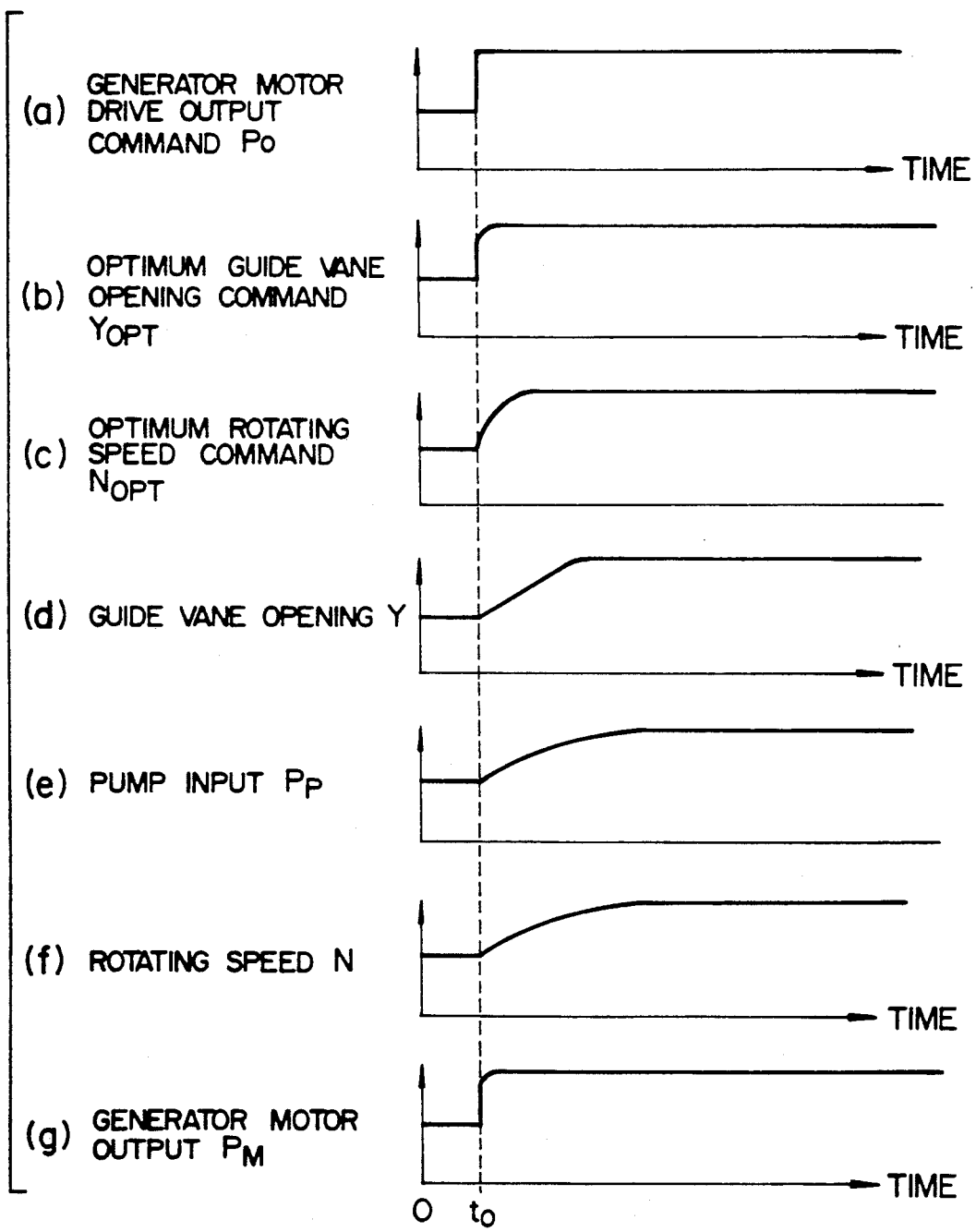
FIGS. 22 and 23 are timing charts for explaining operation.

The method of supplying the predetermined value $\Delta Y_a$ to the control system for the pump turbine 4 is performed through an adder 21 in the same manner as in the embodiment of FIG. 9. First, operation during normal conditions will be described with reference to a timing chart shown in FIG. 22.

As shown in FIG. 22(a), the operation response is made a contrast to the case that a drive output command $P_0$ is raised stepwise at time point $t_0$. In response, a motor output $P_M$ will first rise with a short time lag (FIG. 22(g)). Similarly, a signal $Y_a$ from a guide vane opening function generator 13 and an output signal $N_a$ from a rotating speed function generator 12 will rise having their inherent or previously imparted, predetermined time constants (FIGS. 22(b) and 22(c)).

Meanwhile, because of the presence of the response characteristic of the mechanical system, the actual response of the guide vane opening Y to the signal $Y_a$ will be shown in FIG. 22(d). The presence of a rectilinear portion in the response of the guide vane opening Y indicates that the speed of the servo motor for controlling the guide vane opening is limited (the limit is determined by the limitation on the stroke of the guide vane distributing valve, for example).

The rotating speed N of the pump turbine 4 is accelerated by the difference between the motor output $P_M$ shown in FIG. 22(g) and the pump input $P_p$ shown in FIG. 22(e), to increase and finally converge to $N=N_a$, as shown in FIG. 22(f). The pump input $P_p$, to which the increase in the guide vane opening Y and the increase in the rotating speed N are added, will increase as shown in FIG. 22(e).

On the other hand, the rotating speed N will change very gradually in a stable manner, as shown in FIG. 22(f). This is because, as previously described, the power control correction signal generator 16 comprises a parallel circuit of a proportional element and an integrating element, which can impart a predetermined damping function to the signal generator 16 when their gain is suitably selected.

Next, a control operation necessary to change the operating condition of the other pump turbine 4E sharing the pipe line with the pump turbine 4 will be described.

First, a correction by imparting the above-mentioned predetermined value $\Delta Y_a$ will be described with reference to a timing chart shown in FIG. 23.

Figure 23:
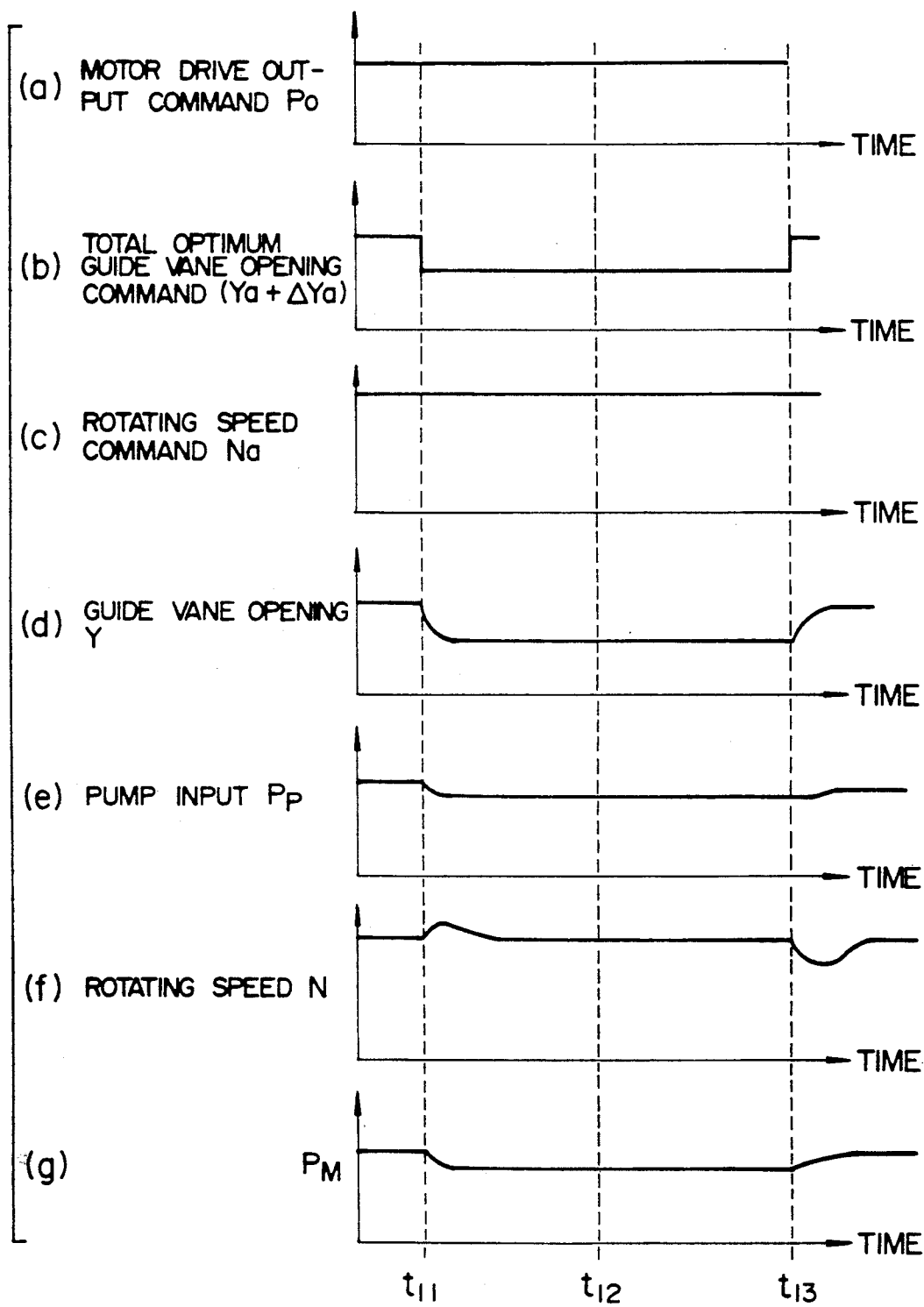

In FIG. 23, at time point $t_{11}$, the optimum guide vane opening command $Y_a$ is temporally adjusted by a predetermined value $\Delta Y_a$, as shown at (b) of FIG. 23.

Then, the guide vane opening Y will thereby be throttled as shown in FIG. 23(d) and the pump input $P_p$ will also be decreased as shown in FIG. 23(e), with the result that the rotating speed N will have a transient increase, though small, as shown in FIG. 23(f).

To suppress the increase in the rotating speed, a control function is obtained, in accordance with which the generator motor output $P_M$ is temporally decreased (FIG. 23(g)).

It will be seen that if, on the other hand, at time point $t_{13}$ of FIG. 23(b) after the operation was settled at time point $t_{12}$, the predetermined value $\Delta Y_a$ is removed, then the operation or action will be reversed and a restoring control is achieved. The time point $t_{13}$, at which the predetermined value $\Delta Y_a$ should be removed, should be selected so as to be after the time point $t_{12}$ settles.

The construction of the control system to which the embodiment is applied may be the same as either one of those shown in FIGS. 8, 9 and 16, and then the predetermined value $Y_a$ may be controlled in different manners.

The predetermined value of $\Delta Y_a$ may be a constant as above-mentioned, and it may also be a variable which is related to the operating control conditions of the other machines, in particular those which are related to the width or speed of a flow rate changing adjustment involving increases in the net pump head for the pump turbine in question. In a more simplified form, the guide vane may be throttled by a constant small degree irrespective of the current guide vane opening value of the pump turbine in question whenever there is a danger that the operating condition will fall into the counterflow characteristic due to changes in the operating condition of the other machine. With respect to such a simplified form, since it is considered to be necessary that the suppression of the rate of change in the operating direction of the other machine is taken into consideration in any case, care should sometimes be taken therefor.

The operation of imparting the predetermined value $\Delta Y_a$ may be performed manually by the operator, and the condition may be provided such that a temporally throttling of the guide vane opening of the pump turbine in question is interlocked to the operation of changing the operating condition of the other machine.

Of course, when the operating condition of the other machine is controlled in the direction in which the net pump head for the pump turbine in question is increased, a command signal may be supplied to the pump turbine in question to impart thereto the predetermined value $\Delta Y_a$.

Figure 24:
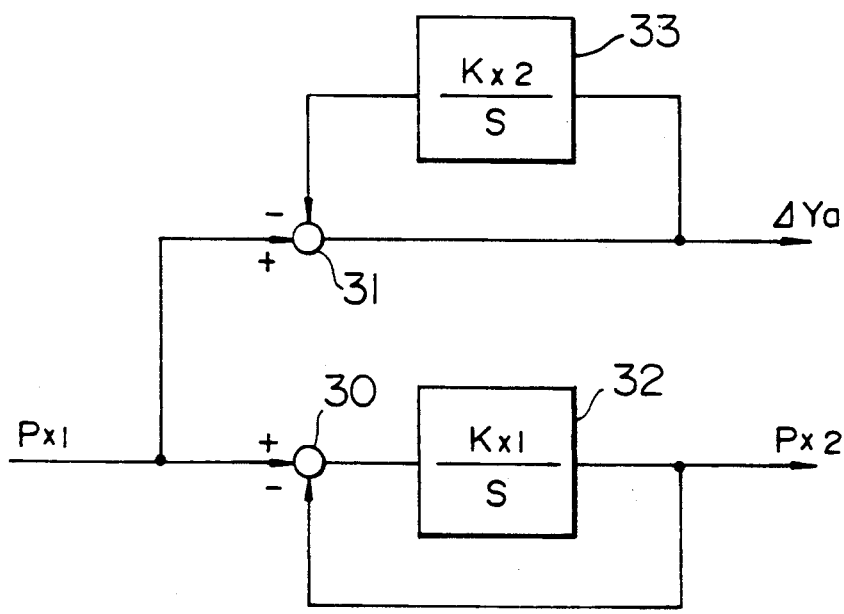
FIG. 24 is a block diagram showing an embodiment of a circuit for generating a correction signal.

FIG. 24 shows an embodiment including a circuit for generating the guide vane opening correction signal for the machine in question in response to an operation which will change the operating condition of the other machine, in particular those operations which will increase the input $P_{x1}$ during pumping-up operation. In this figure, 30 and 31 designate adders, and 32 and 33 integrators (or a similar circuit which has an input error excluding function). $P_{x2}$ represents an input change command which will actually be input to the other machine.

Figure 25:
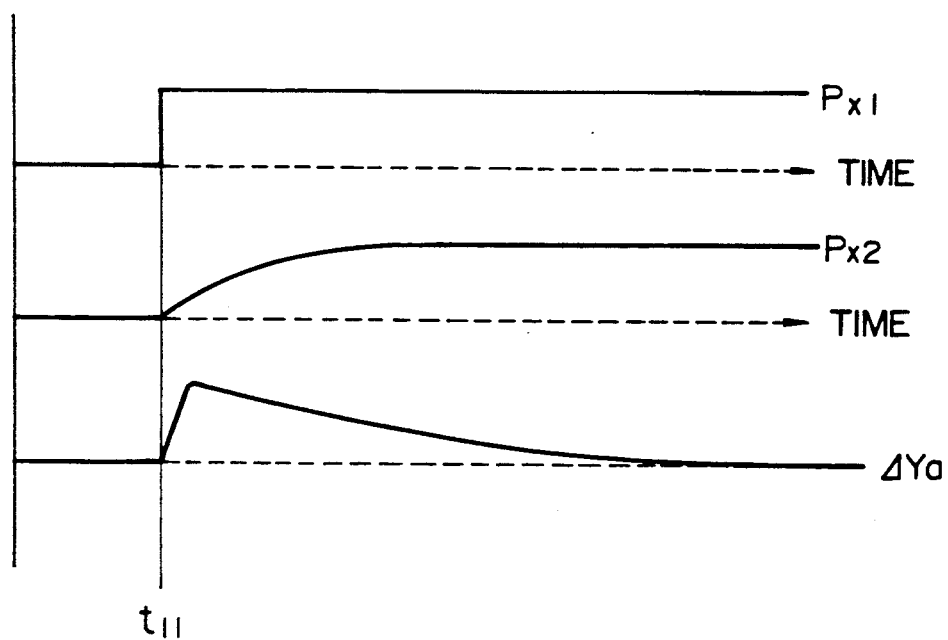
FIG. 25 is a timing chart for explaining the operation of the circuit.

The operation shown in FIG. 25 may be achieved by using this circuit. When a command input $P_{x1}$ to one machine (opposite machine) rises stepwise at time $t_{11}$, the signal $\Delta Y_a$ will be almost simultaneously raised as shown by the action of an integrator 33, whereby the guide vane opening $Y_a$ of the one machine is controlled to be throttled to:

$$Y_a - \Delta Y_a.$$

Meanwhile, at this time, rise of the input command $P_{x2}$ to the opposite actual machine can be suppressed to a moderate degree by the action of an integrator 32 but an increase $\delta H$ in pressure due to the presence of a shared pipe line (for example, pipe line 4A in FIG. 10) is unavoidable to be imported to one machine.

However, since the embodiment is arranged such that, as previously described, the rise of the signal $\Delta Y_a$ caused by the stepwise rise of the command input $P_{x1}$ at time $t_{11}$ will occur more abruptly, it is well possible for one machine to prevent a fall into the counterflow operation region. In the embodiment of FIG. 24, the gain $K_{x2}$ of the integrator 33 may be such that its value is a predetermined value only during the rise of the input $P_{x1}$ and a constant is selected as a sufficient long value during the fall of the input.

In this embodiment, the signal $\Delta Y_a$ is directly used. Alternatively, the signal may be used through a dead zone circuit instead of the signal $\Delta Y_a$.

In such an embodiment, it is possible to actuate the function of the circuit of FIG. 24 only when undesired pressure variations are likely to occur, whereby it is impossible to prevent the operating point from falling into the counterflow characteristic according to the pressure variations.

The above embodiment have been described only in conjunction with increases in the net pump head of a reversible pump turbine associated with operations of the other machine, such as an operation of increasing its discharge during pumping-up mode or an operation of decreasing the flow rate during turbine mode. The present invention, however, can be applied independently of the control operation wherever the net pump head of a pump turbine is likely to be suddenly increased due to an after shock of water-hammer when the operation is reversely made.

In accordance with the present invention, the following effects can be achieved:

Since it is able to detect the complex phenomenon of counterflow in a pump precisely, easily and securely, it can effect an optimum action when applied to protection system a variable speed pumping-up power station.

Since it is possible to reduce the margin of the operation range necessary for the control of operation to avoid a fall into a counterflow characteristic due to the perfection of its measure, the original variable speed operation range can be broadened. That is, with respect to the net pump head, the pump's capacity can be fully used.

Since the present invention eliminates the danger that a variable speed pumping installation is operated while it remains in the counterflow operation region, a satisfactory function of protection can be achieved.

In a pumping installation including a plurality of pump installations sharing an upstream or downstream pipe line, it is possible to securely prevent a pump from falling into a counterflow operation region due to an increase in pressure due to a water hammer arising from another pump, so that a stable operation can be ensured.

In a pumping-up power plant comprising a plurality of reversible pump turbines, for example, it is extremely advantageous from an economical point of view to have an upstream or downstream pipe line shared by pumps. The invention ensures a stable operation in such an installation so that it is possible to fully pursue economical design by the sharing of an upstream or downstream pipe line.

What is claimed is:

1. An operation of a pump in a pumping-up installation including a variable-speed driven pump, the method comprising the steps of:

detecting that an operating condition of said pump has entered a counterflow operation region by a counterflow detecting means;

compulsively changing the operating condition of the pump from an operation command value to a predetermined value by a biasing operation control means; and restoring the operating condition of the pump from the counterflow operation region to a normal region upon a detection of a counterflow by actuating the biasing operation control means, wherein said variable speed operation of the pump is controlled by said biasing operation control means in such a manner that a guide vane opening of the pump determined by an operation command at that time is decreased by a predetermined value and is restored to the former value after a predetermined time interval.

2. A method of controlling an operation of a pump in a pumping-up installation including a variable-speed driven pump, the method comprising the steps of:

detecting that an operating condition of said pump has entered a counterflow operation region by a counterflow detecting means;

compulsively changing the operating condition of the pump from an operation command value to a predetermined value by a biasing operation control means; and restoring the operating condition of the pump from the counterflow operation region to a normal region upon a detection of a counterflow by actuating the biasing operation control means, wherein said counterflow detecting means detects a deviation between the operation command value to said pump and an actual operation detection value, and determines that the pump has entered the counterflow operation region when the deviation exceeds the predetermined value.

3. A method of controlling operation of a pump in a pumping-up installation in which the pump shares a portion of a hydraulic pressure source upstream or downstream of at least one other hydraulic apparatus, the method comprising the steps of analyzing an operation command of the at least one other hydraulic apparatus by a monitoring means, temporally throttling a guide vane opening of the pump to a predetermined value by a correction control means, and actuating a correction control operation of the pump by said correction control means upon a detection of a possible sudden change in an operating condition of the at least one other hydraulic apparatus.

4. The method of controlling a pump as claimed in claim 3, wherein the duration of the temporally throttling of the guide vane opening by said correction of the correction control means is at a time period between an initiation of the correction control by said correction means and a settlement of a water hammer in said hydraulic fluid pressure source.

5. The method of controlling a pump as claimed in claim 3, wherein said operation commands include at least one of a pump starting command of the at least one other hydraulic apparatus and a pump input abrupt-increase command.

* * * * *

UNITED STATES PATENT AND TRADEMARK OFFICE
CERTIFICATE OF CORRECTION

PATENT NO. : 5,090,872
DATED     : February 25, 1992
INVENTOR(S) : KUWABARA, ET AL It is certified that error appears in the above-identified patent and that said Letters Patent is hereby corrected as shown below:

Column 11, line 24, change "12(g)" to --20(g)--
Column 11, line 25, change "12(f)" to --20(f)--

Signed and Sealed this

Third Day of May, 1994

Attest:

BRUCE LEHMAN

Attesting Officer

Commissioner of Patents and Trademarks